United States Patent
Kim et al.

(10) Patent No.: US 11,303,341 B1
(45) Date of Patent: Apr. 12, 2022

(54) COMMUNICATION SYSTEM AND METHOD FOR ASYNCHRONOUS JOINT TRANSMISSIONS USING A CLUSTER-BASED DISTRIBUTED CYCLIC DELAY DIVERSITY SCHEME

(71) Applicant: Mitsubishi Electric Research Laboratories, Inc, Cambridge, MA (US)

(72) Inventors: Kyeong Jin Kim, Lexington, MA (US); Jianlin Guo, Newton, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/100,885

(22) Filed: Nov. 22, 2020

(51) Int. Cl.
*H04B 7/06* (2006.01)
*H04B 7/024* (2017.01)
*H04J 3/06* (2006.01)
*H04B 7/0413* (2017.01)

(52) U.S. Cl.
CPC .......... *H04B 7/0671* (2013.01); *H04B 7/024* (2013.01); *H04B 7/0413* (2013.01); *H04J 3/067* (2013.01); *H04J 3/0667* (2013.01); *H04J 3/0682* (2013.01)

(58) Field of Classification Search
CPC .... H04B 7/0671; H04B 7/024; H04B 7/0413; H04J 3/0667; H04J 3/067; H04J 3/0682
See application file for complete search history.

(56) References Cited

U.S. PATENT DOCUMENTS

| | | |
|---|---|---|
| 2016/0277138 A1* | 9/2016 | Garg .................... H04L 41/0816 |
| 2020/0169345 A1* | 5/2020 | Andersson ............ H04J 3/0641 |
| 2021/0058181 A1* | 2/2021 | Dwivedi ............... H04J 3/0667 |
| 2021/0328697 A1* | 10/2021 | Budnik ............... H04L 67/1095 |

* cited by examiner

Primary Examiner — Janice N Tieu
(74) Attorney, Agent, or Firm — Gennadiy Vinokur; Hironori Tsukamoto

(57) ABSTRACT

The communication system is provided, where the communication system comprises multiple cluster distributed antenna system (MC-DAS) network and a controller. Each cluster in the MC-DAS comprises a cluster master (CM) and remote radio units (RRU), which are in the coverage area of the controller. The controller and the DAS clusters are synchronized using a hierarchical precision time protocol (HPTP). Each DAS cluster is configured to transmit messages independently from other DAS clusters in the plurality of DAS clusters using a distributed cyclic delay diversity (CDD) scheme with a determined length of a cyclic prefix. The controller further comprises a controller configured to transmit a message from the controller to a receiver through one or more DAS clusters of the plurality of the DAS clusters.

16 Claims, 19 Drawing Sheets

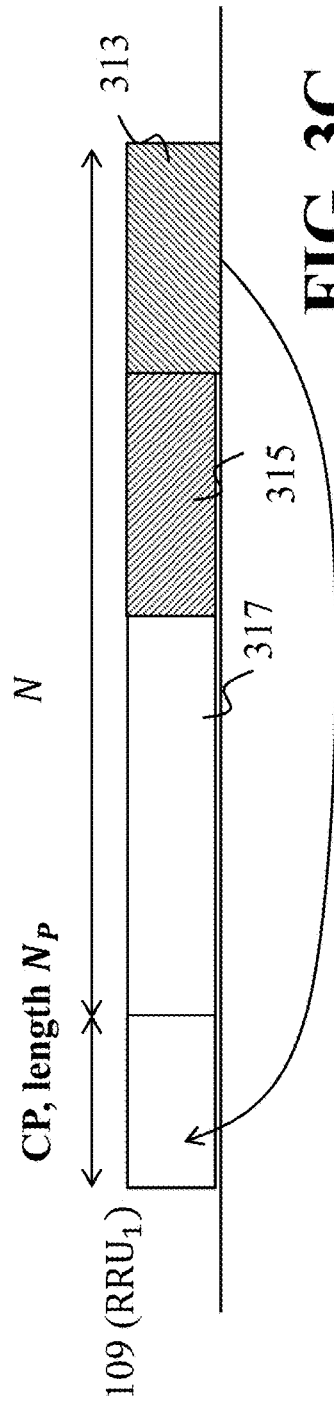
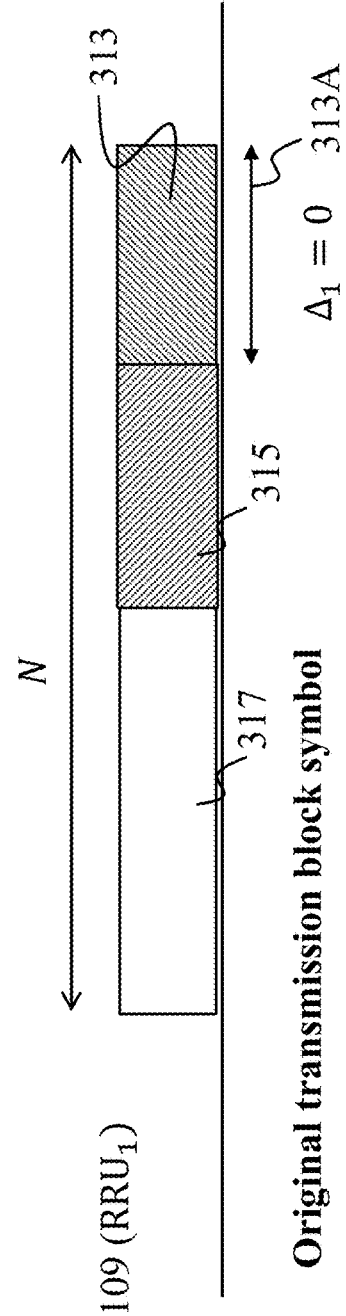
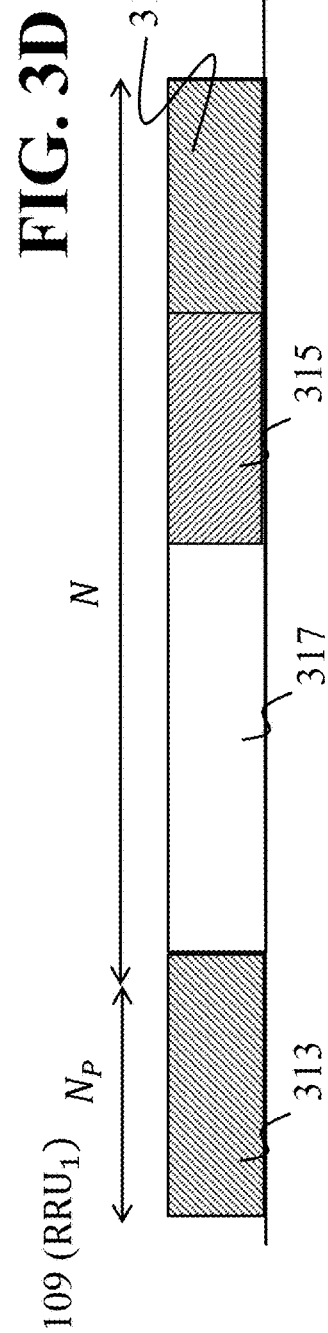
FIG. 3C
FIG. 3D
FIG. 3E

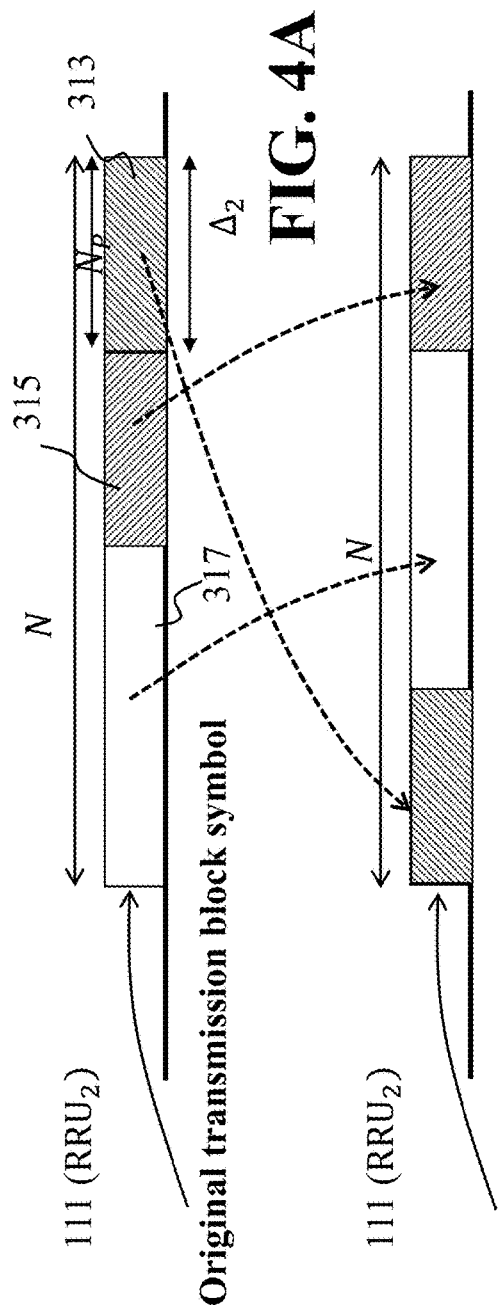
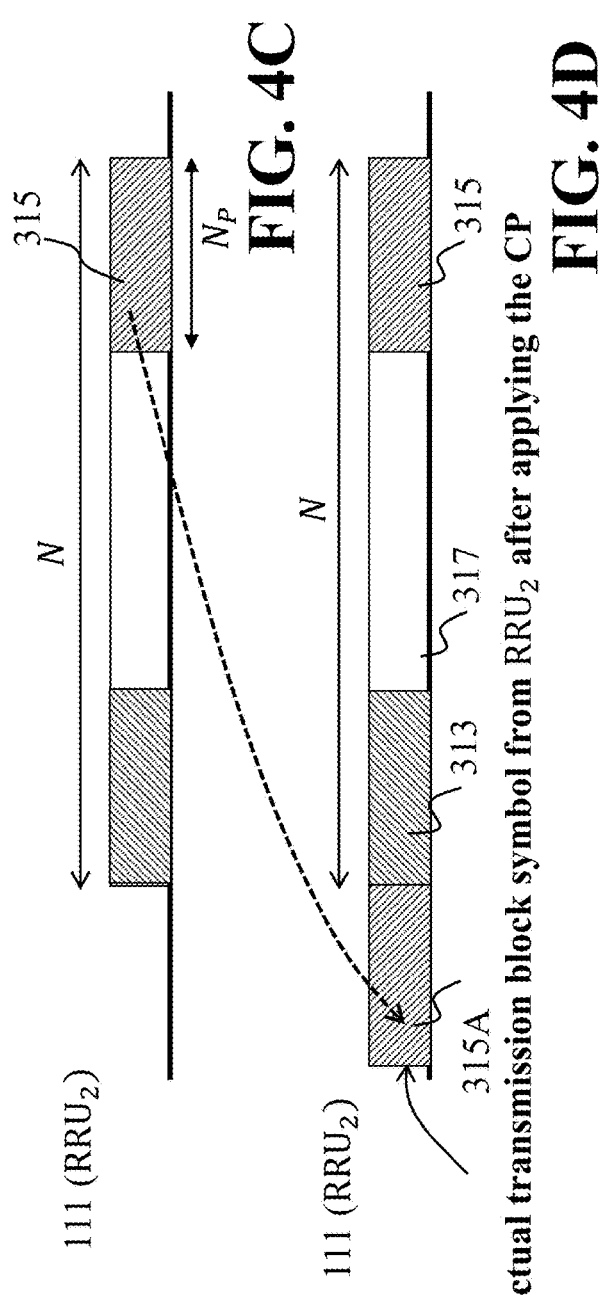

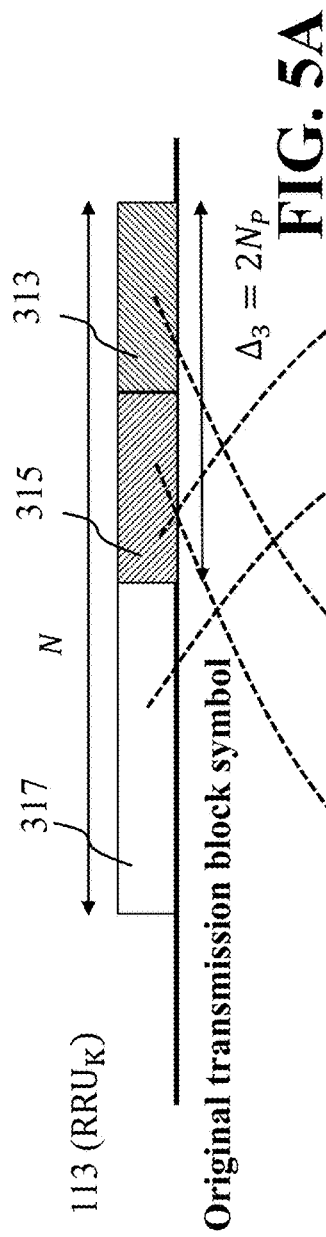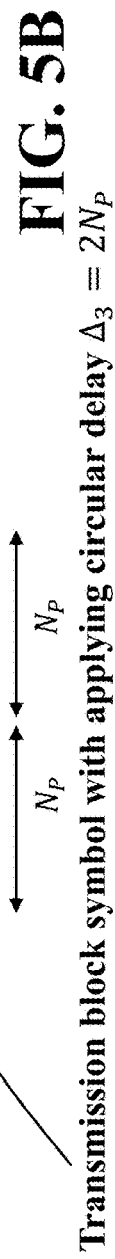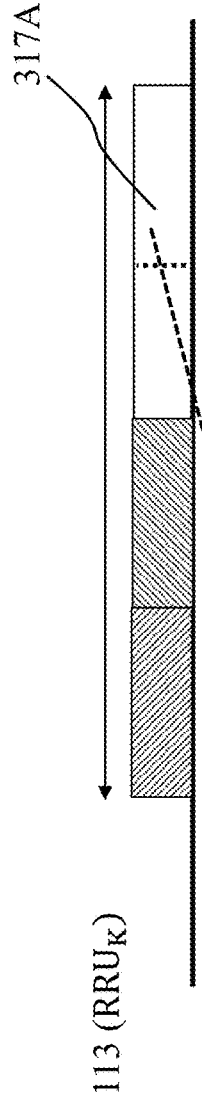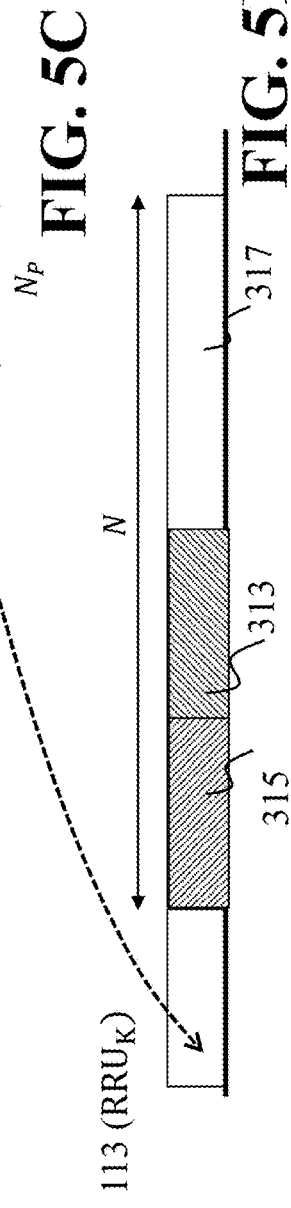
FIG. 5A  Original transmission block symbol
FIG. 5B  Transmission block symbol with applying circular delay $\Delta_3 = 2N_P$
FIG. 5C
FIG. 5D  Actual transmission block symbol from 113 ($RRU_K$) after applying the CP

COMMUNICATION SYSTEM AND METHOD FOR ASYNCHRONOUS JOINT TRANSMISSIONS USING A CLUSTER-BASED DISTRIBUTED CYCLIC DELAY DIVERSITY SCHEME

TECHNICAL FIELD

The present disclosure relates to wireless communication networks, and more particularly to a communication system and a method for asynchronous joint transmissions in private networks using a cluster-based distributed cyclic delay diversity (CDD) scheme.

BACKGROUND

Private networks are a promising new connectivity model for businesses and individuals. The owners of the private networks can optimize services at their facility by planning and installing their own networks, and establishing reliable communication within a specific area by an exclusive use of available resources. Since owners of the private networks have complete control over every aspect of the network, they can determine how resources are utilized, how traffic is prioritized, how a specific security standard is deployed, and so on. Further, many potential applications pertaining to industry, business, utility, and public sector have gravitated towards 5G wireless networks due to increase in stringent performance requirements, in terms of availability, reliability, latency, device density, and throughput. The deployment of the private networks can be feasible in the shared spectrum or unlicensed spectrum. However, by the nature of available radio frequency spectrum for private networks, a low transmit power may be required for signals, so that a dense deployment of small cells, such as femtocells and picocells, is required.

To increase the spectral efficiency and coverage, and to achieve flexible spatial degrees of freedom, a distributed antenna system (DAS), in which antennas are installed in a distributed manner over a coverage area of a base station (BS), can be considered as a promising approach in private networks. However, when the DAS is disposed in the private network it is affected by various problems such as multipath-rich propagation. Further, as the DAS comprises multiple antennas (transmitters), distance of each antenna with respect to a receiver is different. Thus, signal received at the receiver (for example, a user device) suffers from path dependent propagation delays.

Accordingly, there is a need of a communication system that increases the spectral efficiency, reduces fading, and reduces propagation delay in order to effectively implement the DAS in the private networks.

SUMMARY

It is an objective of some embodiments, to provide a communication system implemented with DAS for transmission of messages using with minimum propagation delay. A distributed antenna system, or DAS, is a network of spatially separated antenna nodes connected to a common source via a transport medium that provides wireless service within a geographic area or structure. A distributed antenna system may be deployed indoors (an iDAS) or outdoors (an oDAS).

DASs can be extended to provide indoor private wireless coverage due to the lower cost and ease of deployment. Such an extended DAS can include a centralized radio source, e.g., a base station and/or private network server (PNS) (also referred to as a central network server, CNS) or a central controller (also referred to as controller), and multiple remote radio transceivers called remote radio units (RRU). The multiple RRUs connect to the centralized radio source over a packet-based network, e.g., a local area network.

However, joint processing (JP) of transmission over multiple RRUs in the fading environment of indoor wireless communication is a challenging problem. On one hand, it is desired to increase the number of RRUs to cover larger territory and to increase channel diversities. On the other hand, such an increase would result in additional interference, difficulty in time synchronization, and undesirable feedback overhead.

Some embodiments are based on recognition that the negative effects of the increase of numbers of RRUs forming DAS can be mitigated with transmission via a distributed cyclic delay diversity (CDD) scheme. The distributed CDD is being able to achieve the diversity gain by transmitting a common symbol block without requiring full channel state information (CSI) at the transmitters. Furthermore, the distributed CDD demonstrated that full diversity gain can be achieved without employing forward error correction (FEC) coding by employing cyclic-prefixed single carrier (CP-SC) transmission with CDD under some requirements. In addition, the use of distributed CDD or cooperative CDD provides a more reliable communication network, among other things.

However, the distributed CDD allows only a limited number of RRUs to participate in the transmission of the messages due to the increased size of the cyclic prefix. Specifically, to consider synchronization errors and variation of tap delays of different communication channels connecting the controller with a receiver, some embodiments determine with a minimum length of a cyclic prefix in the distributed CDD scheme as a function of a sum of bound on a synchronization error and a maximum tap delay of communication channels. The length of the cyclic prefix and the length of the message to be transmitted govern the maximum number of RRU that can take part in distributed CDD transmission.

To overcome the above mentioned limitation, some embodiments are based on the realization that if the RRUs in the DAS are clustered such that each cluster works independently from other clusters. Such a clustering transforms the size limitation of CDD transmission from a limitation on all RRUs of the entire DAS to a limitation on RRUs of each cluster, which is much easier to meet. However, such clustering is impossible or at least impractical. This is because in distributed CDD, the time synchronization is determined to the common source, and the tap delays are determined from the common source. Hence, the controller should be a part of each cluster, which would make the operation of the clusters dependent on each other.

Some embodiments are based on the realization that if the RRUs of DAS arranged to transmit messages from the controller to a receiver are partitioned into a plurality of DAS clusters, and if each DAS cluster includes a cluster master (CM) acting as a transceiver in communication with the controller and a plurality of RRUs in communication with the CM transmitter, each DAS cluster of such a hierarchical arrangement can work independently based on distributed CDD if the communication links connecting each of the CM transmitter and the controller are not considered in the distributed CDD of each DAS cluster.

Some embodiments are based on the realization that it is possible to ignore the communication links in the distributed CDD scheme when the controller and the DAS clusters are synchronized using a hierarchical precision time protocol (HPTP) in which the controller and the CM transmitters are master clock and boundary clocks, respectively, while the RRUs are ordinary clocks synchronized to CM transmitters of their corresponding clusters. The HPTP is a protocol used to synchronize clocks throughout a computer network, with principles extendable to private network communication systems. On a local area network, HPTP achieves clock accuracy in the sub-microsecond range, making it suitable for measurement and control systems. To adapt the private network communication system to HPTP synchronization, some embodiments configure the controller and the CM as master clock and boundary clocks with multiple network connections, while the RRUs are configured as ordinary clocks synchronized to CM of their corresponding clusters.

In such a manner, some embodiments disclose a multi-cluster DAS with distributed CDD atop of a multi-level hierarchical PTP, in which the first level is formed by a master-slave arrangement of master and boundary clocks, and the second level is formed by a master-slave arrangement of boundary and ordinary clocks. This multi-level hierarchical PTP allows breaking the dependency of different DAS clusters from a common controller allowing each DAS cluster to utilize distributed CDD independently from another CDD cluster.

Some embodiments are based on the realization that when an antenna is replaced with a BS, the DAS can be recognized as the coordinated multiple point (CoMP), which has been widely used and supported by 3rd Generation Partnership Project (3GPP) Long Term Evolution (LTE). The core concept of CoMP is to provide simultaneous communications by a plurality of BSs to a single or multiple users to improve the rate over a whole communication range. As major approaches of CoMP, coordinated beamforming (CB) and joint JP that includes joint transmission (JT) are available.

Some embodiments are based on the realization that geographically placed BSs enables the communication system properly counter path loss and shadowing. However, it is challenging to collect full CSIT by the distributed system. Although a very reliable channel estimate can be obtained by user equipment, its feedback overhead will be huge as the number of RRUs increases. A conventional codebook based feeding back may not work for CoMP due to significant differences in received signal strength. In the 3GPP LTE, the user equipment feeds back the channel quality indicator (CQI), precoding matrix indicator (PMI), and rank indicator (RI) as CSIT to the serving BS for CoMP operations. The cooperating BSs can obtain corresponding CSIT from the serving BS via X2 interface. In addition, a tight clock synchronization among BSs is beneficial. The lack of clock synchronization among BSs causes interference at the user equipment due to the difference in signal arrival time. When the Global Navigation Satellite System (GNSS) signals are not available in the private area, it is possible to achieve a desired clock synchronization by the precision time protocol (PTP) or over the air synchronization (OAS). When a plurality of BSs transmit simultaneously, the existence of interference is an intrinsic problem as well.

Accordingly, one embodiment discloses a communication system comprising a controller including one or multiple processors configured to transmit a message to a receiver; a plurality of clusters of distributed antenna system (DAS), where each DAS cluster includes a cluster master (CM) in communication with the controller and a plurality of remote radio units (RRUs) in communication with the CM transmitter. The controller and the DAS clusters are synchronized using a hierarchical precision time protocol (HPTP) in which the controller is a master clock, CM transmitters are boundary clocks, and the RRUs are ordinary clocks synchronized to CM transmitters of their corresponding clusters. Each DAS cluster is configured to transmit messages independently from other DAS clusters in the plurality of DAS clusters using a distributed cyclic delay diversity (CDD) scheme with a minimum length of a cyclic prefix determined as a function of a sum of a bound on a synchronization error within the DAS cluster and a maximum tap delay of communication channels starting at the CM transmitter of the DAS cluster.

Accordingly, another embodiment discloses a method in a communication system that includes a controller transmitting a message to a receiver; a plurality of clusters of distributed antenna system (DAS), where each DAS cluster includes a cluster master (CM) in communication with the controller and a plurality of remote radio units (RRUs) in communication with the CM. Further, the controller and the DAS clusters are synchronized using a hierarchical precision time protocol (HPTP) in which the controller is a master clock, CMs are boundary clocks, and the RRUs are ordinary clocks synchronized to the CMs of their corresponding clusters; and where transmitting, by each DAS cluster, messages independently from other DAS clusters in the plurality of DAS clusters using a distributed cyclic delay diversity (CDD) scheme with a minimum length of a cyclic prefix determined as a function of a sum of a bound on a synchronization error within the DAS cluster and a maximum tap delay of communication channels starting at the CM transmitter of the DAS cluster.

BRIEF DESCRIPTION OF THE DRAWINGS

FIG. 3C is a schematic illustrating a step of FIG. 3A, in accordance with an example embodiment.

FIG. 3D and FIG. 3E are schematics illustrating a step of FIG. 3A, according to embodiments of the present disclosure.

FIG. 4A illustrates an RRU that applies cyclic delay diversity (CDD) delay, in accordance with an example embodiment.

FIG. 4B illustrates right shifted parts of the original transmission block symbol, in accordance with an example embodiment.

FIG. 4C illustrates the transmission block structure after applying the CDD delay, in accordance with an example embodiment.

FIG. 4D shows actual transmission block symbol from the RRU, in accordance with an example embodiment.

FIG. 5A shows another RRU that applies the CDD delay, in accordance with an example embodiment.

FIG. 5B illustrates parts of the original transmission block symbol right shifted by the applied CCD delay, in accordance with an example embodiment.

FIG. 5C illustrates the transmission block structure after applying the CDD delay, in accordance with an example embodiment.

FIG. 5D illustrates actual transmission block symbol from the RRU, in accordance with an example embodiment.

DETAILED DESCRIPTION

Figure 1A:
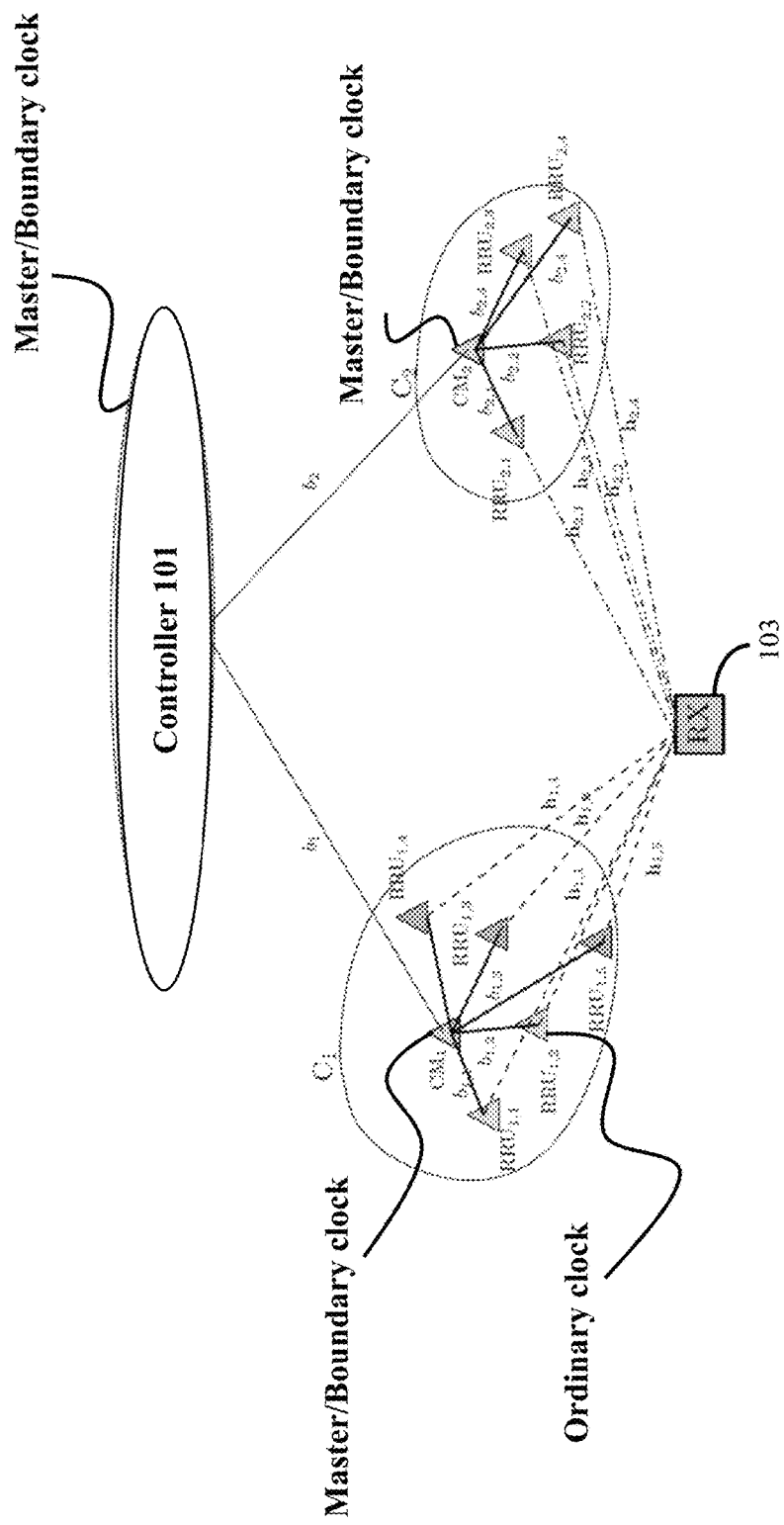
FIG. 1A illustrates a multi-cluster (MC) based distributed antenna system (DAS), in accordance with an example embodiment.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Cyclic Delay Diversity (CDD) and Distributed CDD (DCDD):

Conventionally, a communication system having a controller connected to a set of transmitters. The controller can form a message with symbols including data symbols and an identification symbol. The controller can control the set of transmitters to transmit the message using a cyclic delay diversity (CDD) scheme, such that each transmitter circularly rotates the symbols of the message with a unique shift and copies the last symbol in the rotated message into the first position in the message. For example, by applying a different circular rotation of the unique word (UW), the receiver can detect whether a particular device uses a CDD operation or not. Thus, the receiver can easily detect a fixed number of devices that apply CDD operation. After detection of the CDD transmitters, the receiver can combine the signal only from the CDD transmitters. At least one aspect of the above embodiment is that the controller can form a plurality of different messages, such that the data symbols can vary for at least some of the different messages, and the identification symbol can be fixed for all different messages, where the identification symbol is also referred to as a UW through the present disclosure.

Some embodiments are based on the recognition that a diversity scheme improves the reliability of a message by transmitting over multiple communication channels having different characteristics, where the cyclic delay diversity (CDD) is a diversity scheme used in OFDM-based and single carrier-based telecommunication systems to achieve the diversity gain from only one transmitter with multiple antennas. The length of a cyclic prefix can be more than channel tap delay. The CDD for OFDM does not require feedback and synchronization.

Some embodiments are based on an understanding that CDD schemes designed for a single transmitter can be extended to a concurrent transmission from multiple transmitters, where an extended CDD transmission can be used by road side units in a vehicle-to-infrastructure (V2I) setting, and remote radio head (RRH) in a cloud-radio access network (C-RAN) to achieve cooperative diversity gain, among other things, by coordinating several transmitters, each transmitter sends a delayed copy of information to the receiver, which is referred to as extended CDD transmission from multiple transmitters as distributed CDD.

To that end, some embodiments of the present disclosure are based on the realization a cooperative communication system can have a distributed CDD scheme, that includes a set of spatially distributed cooperating transmitters, rather than only one transmitter as conventional CDD schemes are constructed. However, unlike in the conventional existing works/schemes that use a single transmitter, embodiments of the present disclosure include a system setting, where the CDD scheme is employed among antennas that are installed at the same transmitter. In general, considering hardware complexity and power at the RRU type transmitters, only one antenna can be employed, depending upon the specific application. From this reason, among other reasons, the existing conventional construct teachings are not applicable in regard to the embodiments of the present disclosure's system setting(s). At least one aspect of the present disclosure is that some embodiments provide for a CDD scheme over spatially distributed transmitters equipped with a single antenna, among other things.

Since many different types of transmissions can coexist within the same frequency band, it is necessary to find a right set of transmitters that apply CDD operation. For this problem, the present disclosure provides at least one method for making proper transmitter selection for CDD operation in the presence of multiple different types of transmissions. In fact, some of the embodiment of the present disclosure can be transmitters equipped with a single antenna that can be distributed in space forming a distributed antenna system (DAS) to support wireless access to users.

Some embodiments are based on the recognition that the distributed CDD transmission phases presented a number of challenges including how to overcome conventional construct teachings for CDD transmission for a single transmitter with multiple antennas. For example, although the distributed CDD scheme can achieve a higher throughput, identifying or figuring out which transmitters actually apply to the CDD scheme, as well as addressing the intrinsic problem of inter-symbol interference (ISI) from other transmitters while having multiple transmitters involved in simultaneous transmission, all needed to be overcome. Thus, the present disclosure found necessary to develop an ISI-free CDD scheme. Another challenge is the issue that because CDD operation can be performed by block-wised processing, determining how many transmitters to be assigned as the CDD transmitters, without causing any ISI, also needed to be overcome. Further still, since a particular CDD delay can be assigned at any of the CDD transmitters, determining how to assign a CDD delay to a particular CDD transmitter had to be addressed.

Some embodiments are based on the recognition that the joint processing of transmission over multiple RRUs in the fading environment of indoor wireless communication is a challenging problem. On one hand, it is desired to increase the number of RRUs to cover larger territory and to increase channel diversity. On the other hand, such an increase would result in additional interference, difficulty in time synchronization, and undesirable feedback overhead.

To solve the above problems, a communication system is implemented as a distributed antenna system (DAS) for transmission of messages using with minimum propagation delay. The DAS is a network of spatially separated transmitters (or antenna nodes) connected to a common source via a transport medium that provides wireless service within a geographic area or structure. Further, the spatially separated transmitters in the communication system are arranged into a plurality of clusters. Each cluster is the distributed antenna system (DAS), where each transmitter in the cluster is referred to as a remote radio unit (RRU). Each cluster comprises a cluster master (CM) which is in direct communication with the RRUs of its cluster. Further, the CMs of each group is in direct communication with the controller. In this way, the communication system is arranged in a hierarchical order, where the controller sends the message to the receiver via the plurality of clusters.

In order to implement the communication system with DAS, the spatially distributed transmitters should be synchronized. The present disclosure includes embodiments based on understanding that a hierarchical precision time protocol (HPTP) can be used by the controller to synchronize the different components of the communication system (the controller, the CMs, and the RRUs). The HPTP includes the master clock for the controller, boundary clocks for the CMs, and ordinary clocks for the RRUs. Further, the HPTP may be used to provide timing for the controller to synchronize the set of transmitters within the CDD scheme to correct for a propagation delay.

Further, due to potential significant spatial separation of the transmitters (e.g. RRUs) from each other, different transmitters can have different tap delays for their corresponding communication channels with the receiver. For example, the signal power propagates isotopically in space, and it is degraded inversely proportional to the square of the distance travelled. Thus, the significant spatial separation results in different tap delays depending on the random distance from a particular RRU to the receiver. An aspect as why this is important, among many aspects, is since a path causing a larger delay spread (or larger tap delay) can be much easier to cause ISI, resulting in the need to take care of a different delay spread over the paths from the RRUs to the receiver. By choosing the cyclic prefix whose size is larger than the maximum tap delay, the present disclosure provides a method that removes ISI, among other things. Thus, different time delays need to be considered for the cooperative transmission via distributed CDD. An aspect as to why this needs to be considered, among many reasons, includes that in present disclosures the distributed CDD scheme, different delay spreads over the paths can be also considered in designing the CDD delay and selecting CDD transmitters among coexisting transmitters.

Further, still another challenge with regard to the set of spatially distributed cooperating transmitters, is due to the joint usage of bandwidth allocated for the transmission, the receiver may receive different kind of signals comprising of several number of data symbols. Due to the co-existence of different types of transmissions, the received signal is the mixture from a different transmission power, signal structure, and cooperative scheme. For instance, one transmission applies the CDD scheme, whereas other transmissions do not apply the CDD scheme. Thus, some of the signals can be transmitted from different transmitters using different cooperative transmission schemes and/or independently from each other. To that end, there is a need to distinguish a transmission via distributed CDD from other types of transmissions.

For example, distinguishing the transmission from other types of transmission can be useful, in part, when the CDD operation is unique for a particular transmission. The signals received by different types of transmissions will be interference to a desired received signal. Thus, it is necessary to distinguish a transmission that applies CDD operation from other transmissions that do not apply CDD operation. For this purpose, a unique preamble or signal structure can be used first. By applying the cross correlation with respect to a unique preamble, the receiver can find a desired set of RRUs that apply the desired transmission.

Since the number of CDD transmitters can be limited by a fixed number, it is also necessary to distinguish CDD transmitters from non-CDD transmitters. Since some embodiments of the present disclosure use a unique identification symbol as the cyclic prefix, and when its locations are predetermined for all CDD RRUs, then the receiver searches a set of desired CDD RRUs for its reception process. At least one advantage can include providing a way to find CDD RRUs among coexisting RRUs that use different types of transmissions, so as to provide a way to increase throughput, by removing ISI and other interferences, in its reception process.

Embodiments of the present disclosure can use the HPTP to provide timing to the controller. The controller may synchronize the set of RRUs and CMs within the CDD scheme to correct for a propagation delay and establish the cooperative communication system, which results in reducing the need for tight synchronization within the system. The HPTP can provide synchronization that achieves and maintains coordination among the local clocks in the independent set of RRUs to provide a common notion of time across the set of RRUs and CMs in the cooperative communication system. Based on this configuration, an average time error produced by the HPTP receiver may be reduced. Thus, by knowing the components of the cooperative communication system, i.e., CDD scheme, RRUs, CMs, receivers and HPTP timing, etc., it is possible to determine a synchronization delay or synchronization error for the cooperative communication system specific to the present disclosure.

Some embodiments are based on realization that the problem with synchronization error and differences in tap delays for different communication channels in distributed CDD can be addressed through selecting a proper length of a cyclic prefix. Some embodiments of the present disclosure use a signal structure with a unique identification symbol used as the cyclic prefix. The length of the identification symbol needs to be larger than the maximum tap delay over the channels from a desired set of transmitters to the receiver. For this signal structure, when we apply the cyclic shifting for the remaining part of the data packet except with the unique word, then ISI is appeared in receiver operation. Thus, the desired throughput is not achievable.

To overcome this problem of losing throughput for this new signal structure, some embodiments provide for a CDD scheme that applies the cyclic shifting for the entire data symbols including the identification symbol. For example, taking into account this synchronization error, the systems and methods of the present disclosure are also based on another realization, of combining the synchronization error with a maximum tap delay of the set of cooperating transmitters, to obtain a minimum length CP. Further, a tap delay can be determined for a communication channel between a receiver and each transmitter in the set of transmitters to produce a set of tap delays for the cooperative communication system, wherein a maximum tap delay may be obtained from the set of tap delays. The realization was made by combining the synchronization error with the maximum tap delay, to obtain a minimum length CP which can be used for transmitting a message, via the set of transmitters.

Further, a detailed analysis of the proposed communication system is described below with reference to FIG. 1A.

FIG. 1A illustrates a multi-cluster (MC) based distributed antenna system (DAS) 100, in accordance with an example embodiment. The MC-DAS forms a communication system that may be used in a private network. In some embodiments, the MC-DAS 100 may be deployed indoors such as malls, homes, inside factories, ships, and the like. In some other embodiments, the MC-DAS 100 may be deployed outdoors. The MC-DAS 100 comprises a controller 101 configured to coordinate with or control a plurality of clusters $C_1$ and $C_2$, in order to transmit a message from the controller 101 to a receiver RX 103 through the plurality of clusters $C_1$ and $C_2$. The plurality of clusters $C_1$ and $C_2$ may be arranged in a non-overlapping manner. Further, each cluster of the plurality of clusters C1 and C2 is recognized as the DAS, as each cluster comprises a plurality of remote radio units (RRUs) and cluster master (CM).

The MC-DAS 100 in the private network may be implemented in combination with existing telecommunication networks such as 2G, 3G, 4G, 5G, and the likes. Therefore, the controller 101 is connected to a base station associated with the existing telecommunication network with a wired connection to act as a coordinated multipoint transmitter and receiver.

In FIG. 1A, kth RRU deployed in the ith cluster is denoted by $RRU_{i,k}$. For example, first RRU (k=1) in the first cluster $C_1$ (i=1) is denoted by $RRU_{1,1}$. Thus, the first cluster $C_1$ (i=1) comprises $RRU_{1,1}$, $RRU_{1,2}$, $RRU_{1,3}$, $RRU_{1,4}$, and $RRU_{1,5}$. Further, the $C_1$ comprises a first cluster master ($CM_1$), where all the RRUs in the $C_1$ are in communication with $CM_1$ of the cluster, and where the $CM_1$ is in communication with the controller 101. Similarly, second cluster $C_2$ (1=2) comprises $RRU_{2,1}$, $RRU_{2,2}$, $RRU_{2,3}$, and $RRU_{2,4}$. Similarly, the $C_2$ comprises a second cluster master ($CM_2$), where all the RRUs in the $C_2$ are in communication with $CM_2$ of the cluster, and where the $CM_1$ is in communication with the controller 101. The RRUs are connected wirelessly to the CM of their corresponding DAS cluster, and the controller 101 is connected wirelessly with the CMs.

The MC-DAS 100 further comprises a receiver RX 103, where the RX 103 is co-located with the two clusters $C_1$ and $C_2$, so that the receiver RX 103, clusters $C_1$ and $C_2$ are all in the coverage area of the controller 101. Further, backhaul links, $\{b_1, b_2\}$, are configured to provide broadband backhaul access to the clusters $C_1$ and $C_2$ via the coordinator or control that resides at the controller 101. Other backhaul links, $\{b_{ij}, i=1, 2; j=1, \ldots, K\}$, provide broadband backhaul access to remote radio units (RRUs) via CMs, $CM_1$ and $CM_2$. The CM controls all the RRUs within the cluster and responses to transmitting signals. For example, the $CM_1$ controls all the RRUs within the cluster $C_1$ whereas $CM_2$ controls all the RRUs within the cluster $C_2$.

Further, the MC-DAS 100 uses the hierarchical precision time protocol (HPTP) to synchronize the controller 101 and the plurality of clusters C1 and C2. To that end, the HPTP implements clock synchronization of different elements (such as controller 101, CMs, and RRUs). The HPTP is utilized to configure controller 101 as a master clock, CMs (e.g., $CM_1$ and $CM_2$) as boundary clocks, and RRUs as ordinary clocks.

In another embodiment, the HPTP is utilized to configure each CM as the master clock and the controller as the boundary clock so that the CM can compute propagation delay of a message to the RX 103 passing over a particular RRU. In order to deploy RRU, every node in the cluster may be equipped with a single antenna.

Further, the controller 101 may include one or multiple processors, where the controller 101 utilizes a multi-level hierarchical tree structure arrangement comprising the master clock, the boundary clocks, and the ordinary clocks to enable each DAS cluster of the plurality of DAS clusters work independent of each other. The controller 101 may be also configured to transmit a message from the controller 101 to the receiver RX 103 through one or more DAS clusters of the plurality of DAS clusters (i.e. the plurality of clusters $C_1$ and $C_2$), independent of each other. For example, in FIG. 1A, the controller 101 is configured to transmit the message from the controller 101 to the receiver RX 103 through the plurality of clusters $C_1$ and $C_2$. Since the receiver RX 103 receives the message (or signal) from the plurality of cluster $C_1$ and $C_2$, the receiver RX 103 utilizes the single-user-multiple input and single output (SU-MISO) mode of operation, and thus increases the throughput.

As the message from the controller 101 arrives at the receiver RX 103 from a plurality of paths associated with the plurality of clusters $C_1$ and $C_2$, the message may suffer from frequency selective fading. To deal with the frequency selective fading, cyclic-prefixed single carrier (CP-SC) transmissions may be employed in the MC-DAS 100. To that end, the frequency selectivity can be exploited as the frequency diversity based on available information for a maximum number of multipath components over the MC-DAS 100. In addition, MS-DAS 100 can achieve increased transmit diversity in multipath-rich environments by utilization of cooperative CP-SC transmissions.

In FIG. 1A, a frequency selective fading channel from the kth RRU deployed in the ith cluster, denoted by $RRU_{i,k}$, to the receiver RX 103 is denoted by $h_{i,k}$ with $L(h_{i,k})=N_{i,k}$, where $L(h_{i,k})$ represents cardinality of $h_{i,k}$. And $N_{i,k}$ is a set of non-negative integers. The distance-dependent large scaling fading is denoted by $a_{i,k}$. For a distance $d_{i,k}$ from $RRU_{i,k}$ to the RX 103, $a_{i,k}$ is defined by $a_{i,k}=(d_{i,k})^{-\epsilon}$, where $\epsilon$ denotes the path loss exponent.

In some embodiments, the receiver RX 103 may be placed at a specific location with respect to the RRUs. Accordingly, independent but non-identically distributed frequency selective fading channels from the RRUs to RX 103 are obtained. In some embodiments, the RX 103 may have information of the number of multipath components of the channels connected to itself by either sending the training sequence or adding the pilot as the suffix to each symbol block.

Figure 1B:
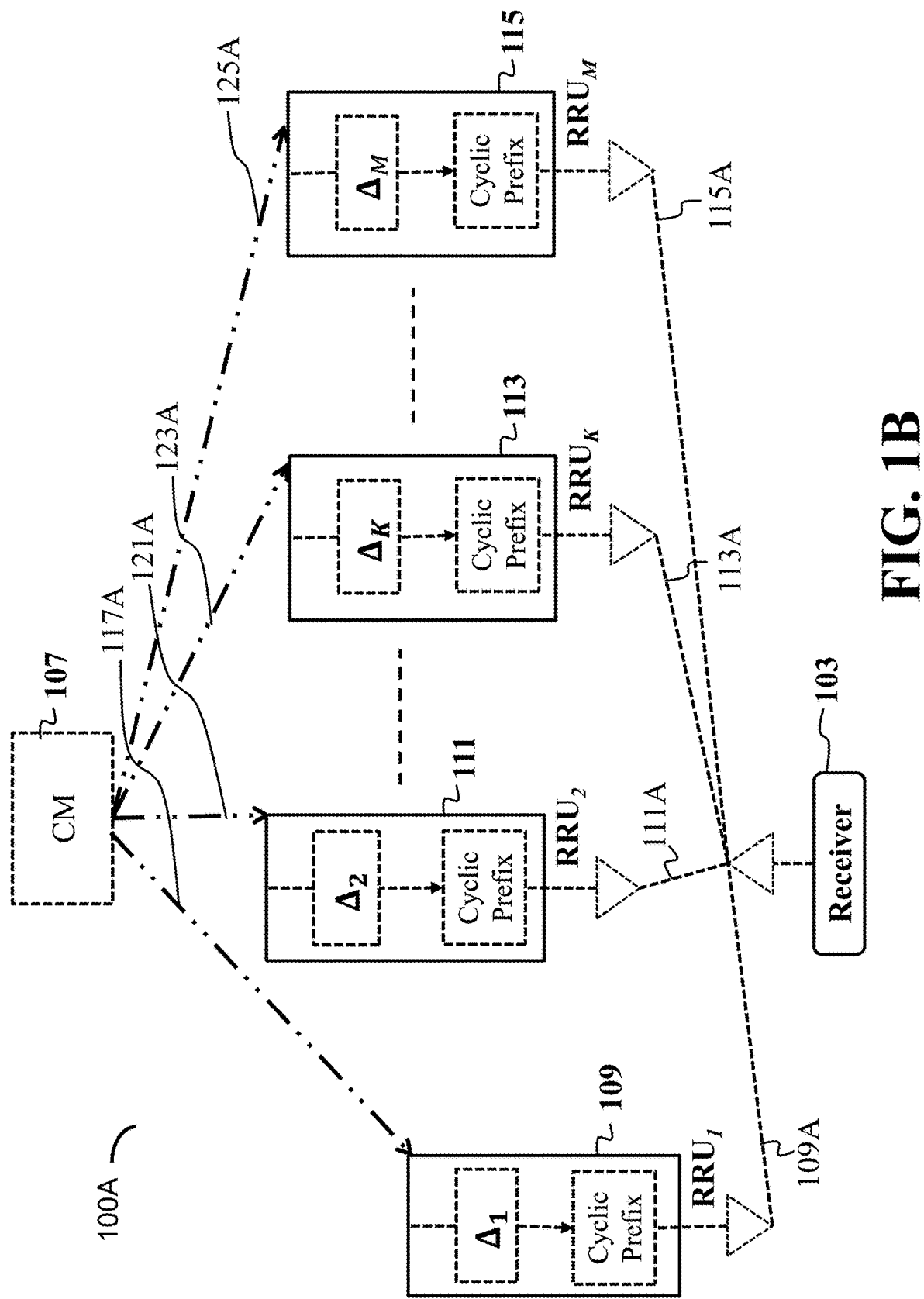
FIG. 1B illustrates a schematic of a method for determining lengths of cyclic prefixes in communication system, in accordance with an example embodiment.
Figure 1C:
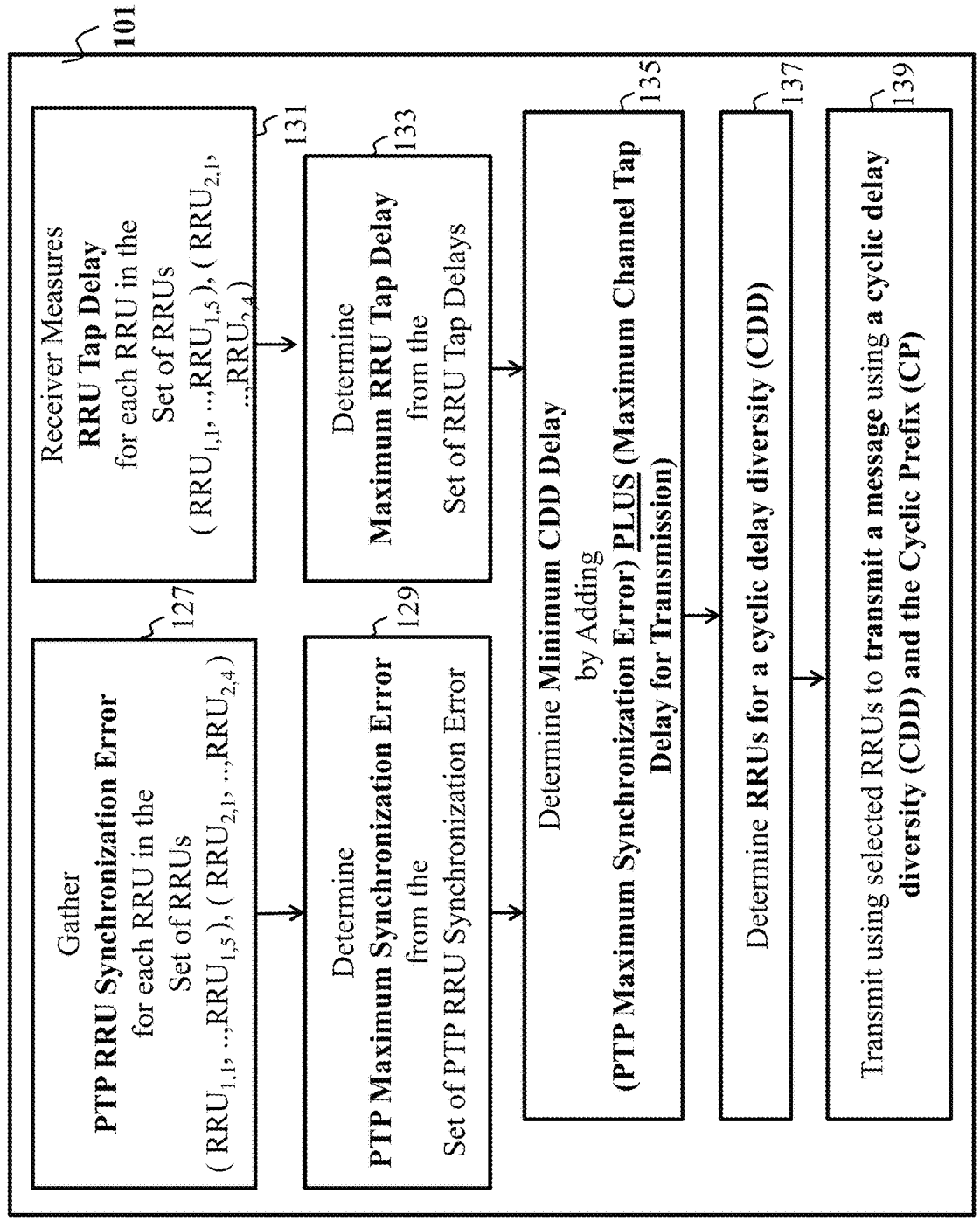
FIG. 1C illustrates flow diagram for determining minimal length of cyclic prefix used with the message to be transmitted from controller to receiver (RX), in accordance with an example embodiment.

One of the objectives of the present disclosure is to determine the length of cyclic prefixes. FIG. 1B and FIG. 1C, in conjunction, describe determination of the minimal length of the cyclic prefixes. FIG. 1B illustrates an exemplary cluster, 100A, where each RRU in the cluster has obtained CDD delay ii and cyclic prefix to be applied to the message to be transmitted to the receiver 103, in accordance with an example embodiment. Further, the cluster comprises a cluster master (CM) 107, $RRU_1$, $RRU_2$, $RRU_K$, and $RRU_M$, and a receiver 103. The CM 107 is in direct communication with the controller 101 (not shown in the FIG. 1B). The CDD and the cyclic prefix for each RRU may be calculated by the controller 101 and forwarded to the corresponding RRU via CM 107. Further, the receiver 103 is in communication with RRUs 109, 111, 113, and 115 (also called as RRUs 109-115) wirelessly via signals 109A, 111A, 113A, and 115A.

The cluster master (CM) 107 is in communication with M RRUs via channels 117A, 121A, 123A, and 125A, respectively. The CM 107 is in communication with the controller 101 (not shown in the FIG. 1B), where the controller 101 uses the HPTP to synchronize different components of the communication system 100 that the HPTP enables the controller 101 to work as a master clock, the CM 107 to work as the boundary clock, and the RRUs 109-115 to work as boundary clock. In another embodiment, the HPTP enables the controller 101 to work as a boundary clock, the CM 107 to works as the master clock, and the RRUs 109-115 to work as ordinary clocks.

The CM 107 may synchronize the set of RRUs 109, 111, 113, and 115 within a CDD scheme to correct a propagation delay, which results in reducing the need for tight synchronization within the communication system. The HPTP provides synchronization that achieves and maintains coordination among the master clock, the boundary clocks, and the ordinary clocks to provide a common notion of time across the CM 107 and the set of RRUs 109-115 in the cooperative communication system. Further, the cyclic prefix used by each RRU is computed by the controller. The RRUs are configured to use the minimal length cyclic prefix. A detailed description of determining the minimal cyclic prefix is provided below with reference to FIG. 1C.

FIG. 1C illustrates flow diagram for determining the minimal length of cyclic prefix used with the message to be transmitted from the controller 101 to receiver 103, in accordance with an example embodiment. The controller 101 may execute operations including steps 127-139 to determine minimal length of the cyclic prefix.

At step 127, HPTP RRU Synchronization Error $(\Delta S_1, \ldots, \Delta S_M)$ is gathered for each RRU in the set of RRUs of the plurality of clusters such as the exemplary cluster illustrated in FIG. 1B. For example, the HPTP RRU Synchronization Error $(\Delta S_1, \ldots, \Delta S_M)$ is gathered from cluster $C_1$ and $C_2$ (illustrated in FIG. 1A) such as $RRU_{1,1}, \ldots, RRU_{1,5}$ of $C_1$ and $RRU_{2,1}, \ldots, RRU_{2,4}$ of $C_2$. A HPTP RRU synchronization error is determined based on HPTP. Further, all of $\Delta S$ s are assumed to be less than $\Delta S_{bound}$.

At step 129, HPTP Maximum Synchronization Error from the set of HPTP RRU Synchronization Errors is determined. Based on the HPTP protocol, the bound on the HPTP RRU synchronization error $\Delta S_{bound}$ can be found offline. To work even in worst applications, the communication system (MC-DAS) needs to consider the worst synchronization error (maximum sync error)$\Delta S_{bound}$ to remove its possible appearance as inter-symbol interference (ISI). Therefore the synchronization error bound, $\Delta S_{bound}$ is considered as an upper bound on the error.

At step 131, the receiver 103 measures the RRU Tap Delay for each RRU in the set of RRUs. In case of plurality of receivers (e.g., the receiver RX 103), each receiver may measure the maximum tap delay via channel sounding techniques, where the RRUs send known pilot signals to the receiver RX 103, which then measures the extent of the channel dispersion. Without exact knowledge of the maximum tap delay, the receiver RX 103 experiences ISI. Thus, to achieve better reliability of the receiving signal, some embodiments are based on a realization that a coordination processor only knows the maximum tap delays rather than the full channel state information.

At step 133, the maximum RRU tap delay from the set of RRU tap delays is measured. The receiver RX 103 computes the delay spread of each channel between itself and the RRUs. Once the receiver RX 103 has the set of channel delays $(N_{f1}, \ldots, N_{fM})$, it sorts them in ascending order and then chooses the largest delay $N_f = \max(N_{f1}, \ldots, N_{fM})$ from the measurements.

At step 135, the minimum CDD delay length A, is determined by adding the HPTP maximum synchronization error, $\Delta S_{bound}$ and the maximum RRU tap delay $N_f$. In some embodiments, it is required to satisfy the least overhead ratio of the additional CP length $N_{CP}$ to the original symbol block size Q. In general, less overhead (i.e., shorter CP length) is preferable. For example, if the CP length is reduced, then the transmission time can be increased. However, if the CP length is reduced without a limit, the interference appears at the receiver. Thus, it is required to satisfy two goals; reducing the CP length while removing the interference at the receiver 103. Since the time synchronization between distributed RRUs affects the receiver performance, time synchronization error is required to be considered. In such a scenario, the worst time synchronization error is taken into account. To remove interference from the receiving signal, the CP length as $N_{CP} \geq N_f + \Delta S_{bound}$ is used. To achieve the least overhead ratio, the CP length as $N_{CP} \geq N_f + \Delta S_{bound}$ is used. According to the computed $N_{CP}$, the CDD delay is determined as $\Delta_i = (i-1)N_{CP}$, with $\Delta_1 = 0$. Some embodiments are based on the realization that the CP length needs to extend beyond the longest channel delay spread and the effect of the HPTP timing error bounds.

At step 137, M RRUs is determined out of K (K≥M) RRUs in applying CDD. With respect to the transmission block size Q, the number of RRUs is determined by M=floor ($Q/N_{CP}$), where floor(.) denotes the floor function. To determine RRUs out of K RRUs, the receiver 103 computes a set of effective signal-to-noise ratios (SNRs) over the channels from the RRUs to the receiver 103. For the same pilots symbols, the effective SNR for the kth RRU is given by $\gamma_k = P_T \|h_k\|^2 / \alpha_n^2$, where $P_T$ denotes the transmit power from the RRUs, $\alpha_n^2$ denotes the noise power, and $\|h_k\|^2$ denotes the channel power for a channel vector $h_k$. Further, the receiver 103 sorts the effective SNRs to obtain the corresponding RRU index. For instance, ($RRU_{1,2}$, $RRU_{1,1}$, $RRU_{1,4}$, $RRU_{1,3}$) indicates that $RRU_{1,3}$ has the largest effective SNR and $RRU_{1,2}$ has the smallest effective SNR out of four transmitters. The receiver RX 103 sends back the RRU index, e.g., ((1,2), (1,1), (1,4), (1,3)), to the controller 101. Then, the controller 101 chooses the M RRUs which are indexed by the last M elements of the received RRU indexing vector. For instance, when M=2 RRUs are supported by CDD, then the controller 101 selects $RRU_{1,3}$ and $RRU_{1,4}$ for CDD, since these two RRUs provide two largest effective SNRs at the receiver 103. Since the receiver 103 sends back only the RRU index, the feedback overhead can be reduced.

At step 139, a message using a cyclic delay diversity (CDD) with the CDD delay and cyclic prefix is transmitted via the set of RRUs. In accordance with CDD operation, a different CDD delay $\Delta_i$ is applied to each RRU. Further, the cyclic prefix is applied that is appending the last symbols where its number is same as the length of the cyclic prefix to the front of the original transmission symbol block. The messages using CDD and the cyclic prefixes are further explained in FIGS. 3A-5D.

Figure 1D:
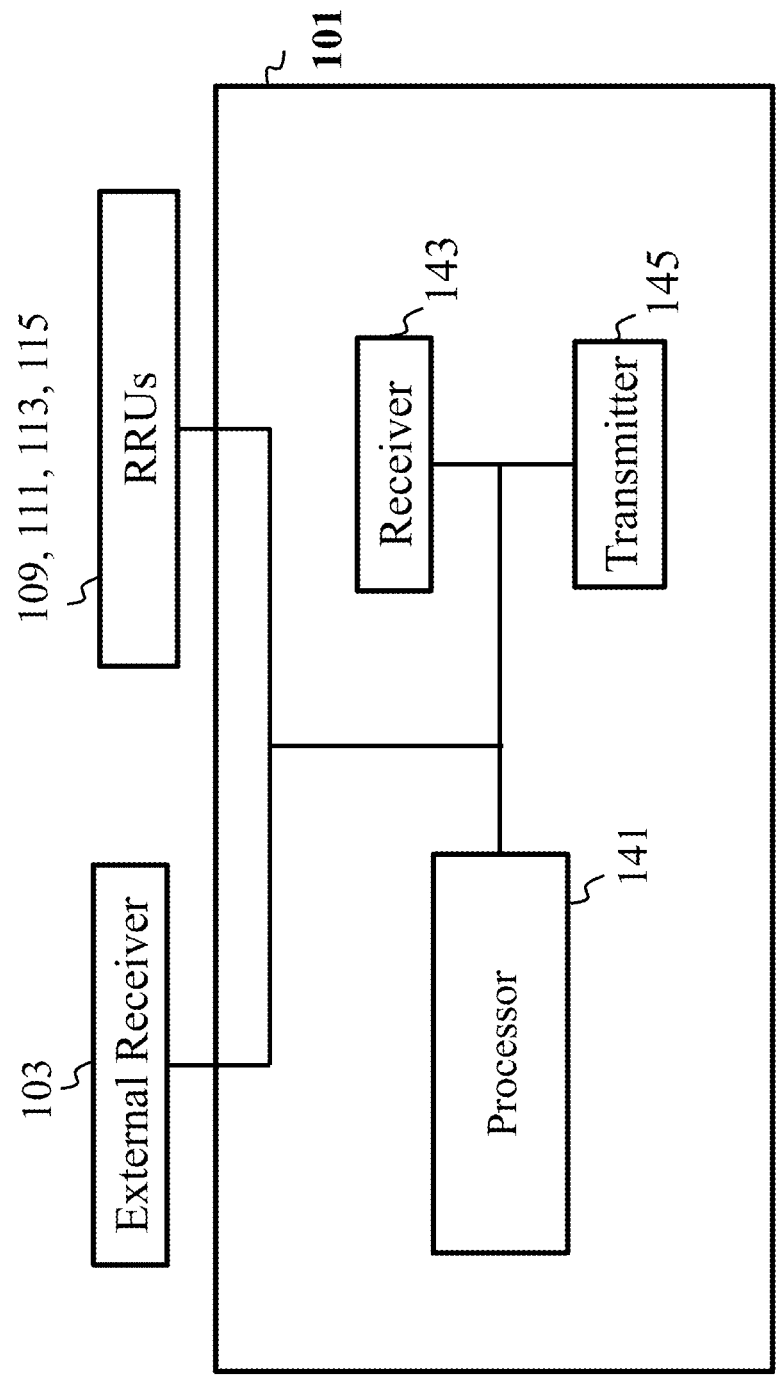
FIG. 1D illustrates a block diagram of a controller that controls the communication system, in accordance with an example embodiment.

FIG. 1D illustrates a block diagram of the controller 101 that controls the communication system, in accordance with an example embodiment. FIG. 1D is described in conjunction with description of FIG. 1C. The controller 101 includes a number of elements including a processor 141, a receiver 143, a transmitter 145, and the like. The controller 101 gathers the maximum time synchronization error and the measured maximum channel tap length from the receiver 143. The controller 101 further computes the maximum allowable number of RRUs considering the maximum channel tap length, maximum time synchronization error, and the transmission symbol block size. The controller 101 further chooses a number of RRUs 109-115 that applies the CDD. The controller 101 then assigns a different delay to a chosen RRU.

Further, the receiver 103 computes the maximum channel tap length and provides it to the controller 101. The controller 101 computes the CP length and the CDD delays taking account for maximum time synchronization error. Further, the controller 101 determines RRUs that apply CDD. Then, the controller 101 provides a selected CDD delay $\Delta_i$ for a RRU one by one.

Figure 2A:
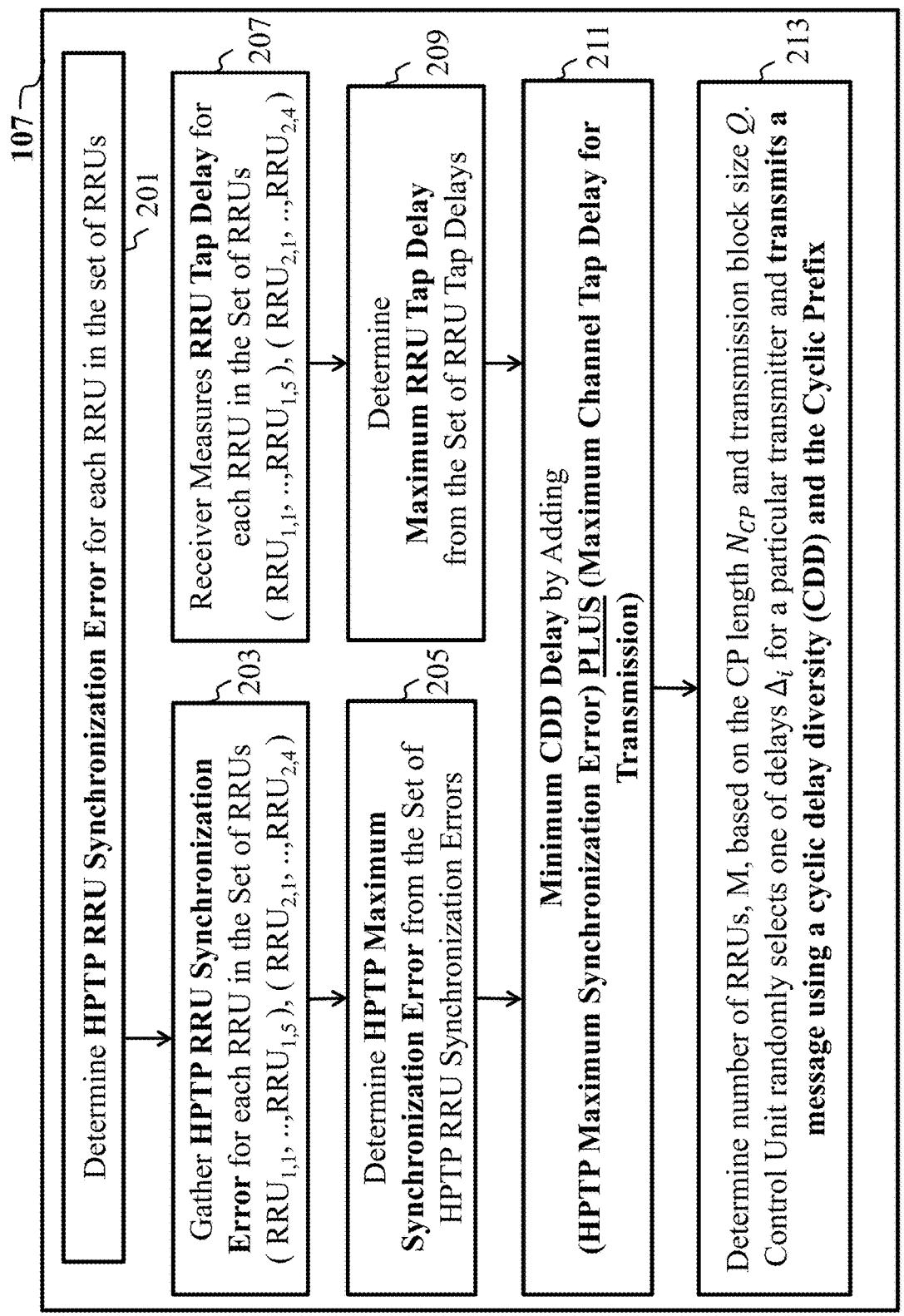
FIG. 2A illustrates a flow diagram of another method for communication networks that includes determining lengths of cyclic prefixes in communication systems and the number of transmitters, in accordance with an example embodiment.

FIG. 2A illustrates a flow diagram of another method for communication networks that includes determining the length of cyclic prefix in communication systems and the number of transmitters, in accordance with an example embodiment. At step 201, the HPTP RRU synchronization error for each RRU in the set of RRUs is determined.

At step 203, the HPTP RRUs synchronization errors ($\Delta S_1$, . . . , $\Delta S_M$) for each RRU in the set of RRUs ($RRU_{1,1}$, . . . ,$RRU_{1,5}$), ($RRU_{2,1}$, . . . ,$RRU_{2,4}$) are gathered. At step 205, HPTP Maximum Synchronization Error from the set of HPTP RRU Synchronization Errors may be determined. At step 207, the RRU Tap Delay for each RRU in the set of RRUs ($RRU_{1,1}$, . . . ,$RRU_{1,5}$), ($RRU_{2,1}$, . . . ,$RRU_{2,4}$) is measured by the receiver. At step 209, the maximum RRU tap delay from the set of RRU tap delays is determined. At step 211, the minimum CDD delay is determined by adding the HPTP maximum synchronization error plus the maximum RRU tap delay.

At step 213, the number of transmitters, M, is determined based on the maximum channel tap length $N_f$, synchronization error bound $\Delta S_{bound}$ and transmission block size Q. Since there may be more number of RRUs that CDD can support, it is necessary to determine what the maximum number of transmitters will need to be. To do this, the block size needs to be considered to remove interference. The control unit randomly selects one of delays $\Delta_i$ for a particular transmitter and transmits a message using a cyclic delay diversity (CDD) with the minimum length of cyclic prefix. If the maximum likelihood detector is used for data detection in the receiver, then the detector performance is independent of the different delay when the equivalent channel matrix is circulant. Thus, the control unit randomly selects any one of the delays that were not chosen for other RRUs for a particular RRU and then controls this RRU to transmit a message using the cyclic delay diversity.

Figure 2B:
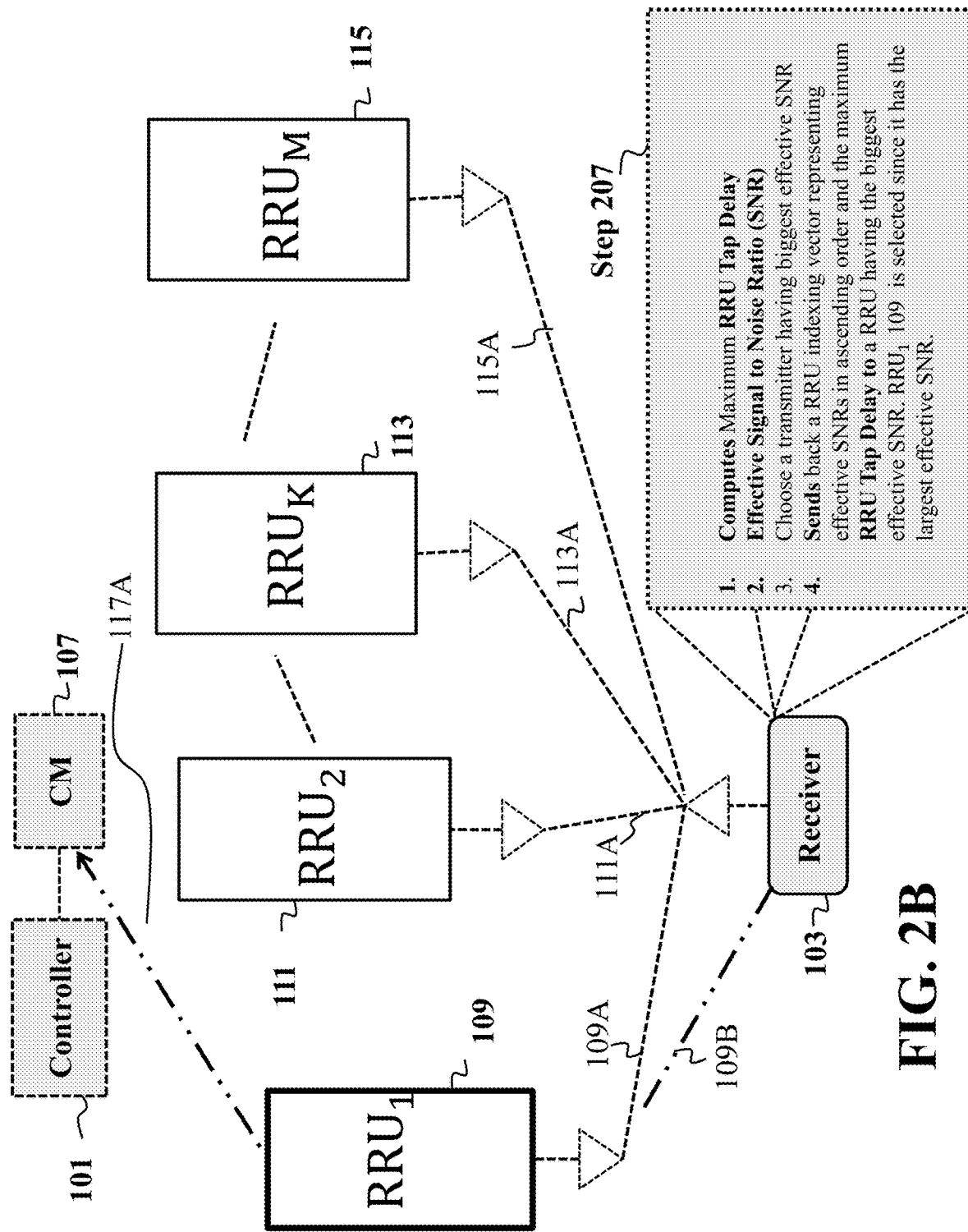
FIG. 2B illustrates the receiver measuring remote radio unit (RRU) tap delay for each RRU in the set of RRUs, in accordance with an example embodiment.

FIG. 2B illustrates the receiver 103 measuring RRU tap delay for each RRU in the set of RRUs, in accordance with an example embodiment. FIG. 2B is described in conjunction with step 207 of FIG. 2A. The receiver measures tap delays ($N_{f1}$, $N_{f2}$, . . . ,$N_{fM}$) for the links between the RRUs and itself, and then computes the maximum tap delay $N_f = \max(N_{f1}, N_{f2}, . . . ,N_{fM})$. The receiver 103 also measures the effective received signal-to-noise ratios (SNRs) at the receiver 103 over the channels (109A, 111A, 113A, and 115A). The receiver 103 further sorts the effective received SNRs in terms of their magnitudes, and chooses a RRU that has the largest magnitude, for example, $RRU_i$ (109). For the CDD operation, the receiver 103 sends back a RRU indexing vector representing effective SNRs in ascending order, for example, (2,1,4,3), and the maximum RRU Tap Delay $N_f$ to RRU 109 via a channel 109A.

For example, the receiver 103 first measures the RRU tap delay for each RRU in the set of RRUs ($RRU_{1,1}$, . . . ,$RRU_{1,5}$), ($RRU_{2,1}$, . . . ,$RRU_{2,4}$) and then computes the maximum RRU tap delay. Second, includes an effective signal to noise Ratio (SNR), for each channel in the set of channels 109A, 111A, 113A, 115A. The receiver 103, then sorts effective SNRs and chooses a RRU having the biggest effective SNR. Then, sends back a RRU indexing vector representing effective SNRs in ascending order and the maximum RRU tap delay to a RRU having the biggest effective SNR. In this example, RRU 109 is selected since it has the largest effective SNR.

Figure 3A:
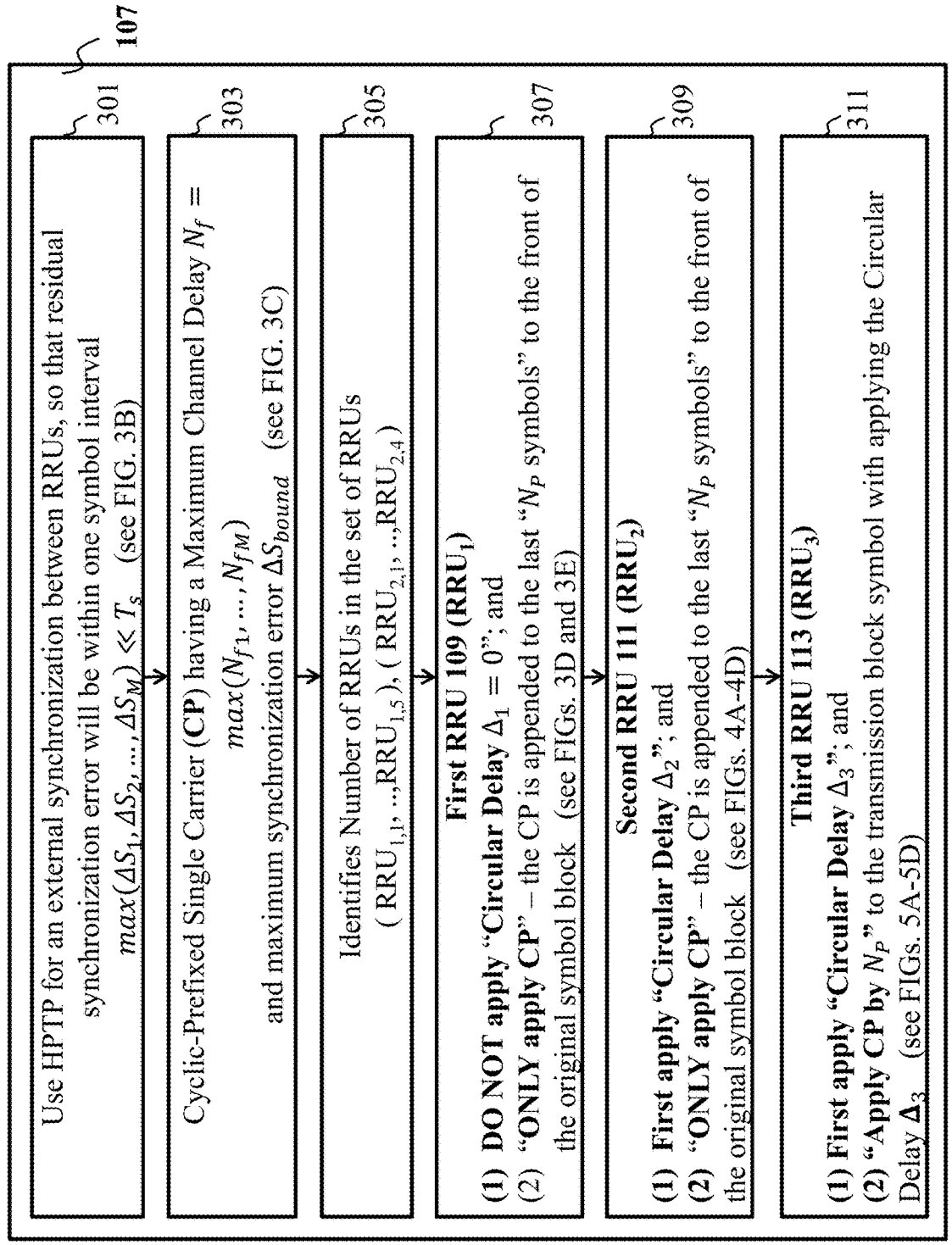
FIG. 3A shows a block diagram illustrating a flow chart implementing the minimum cyclic prefix into the message, in accordance with an example embodiment.
Figure 3B:
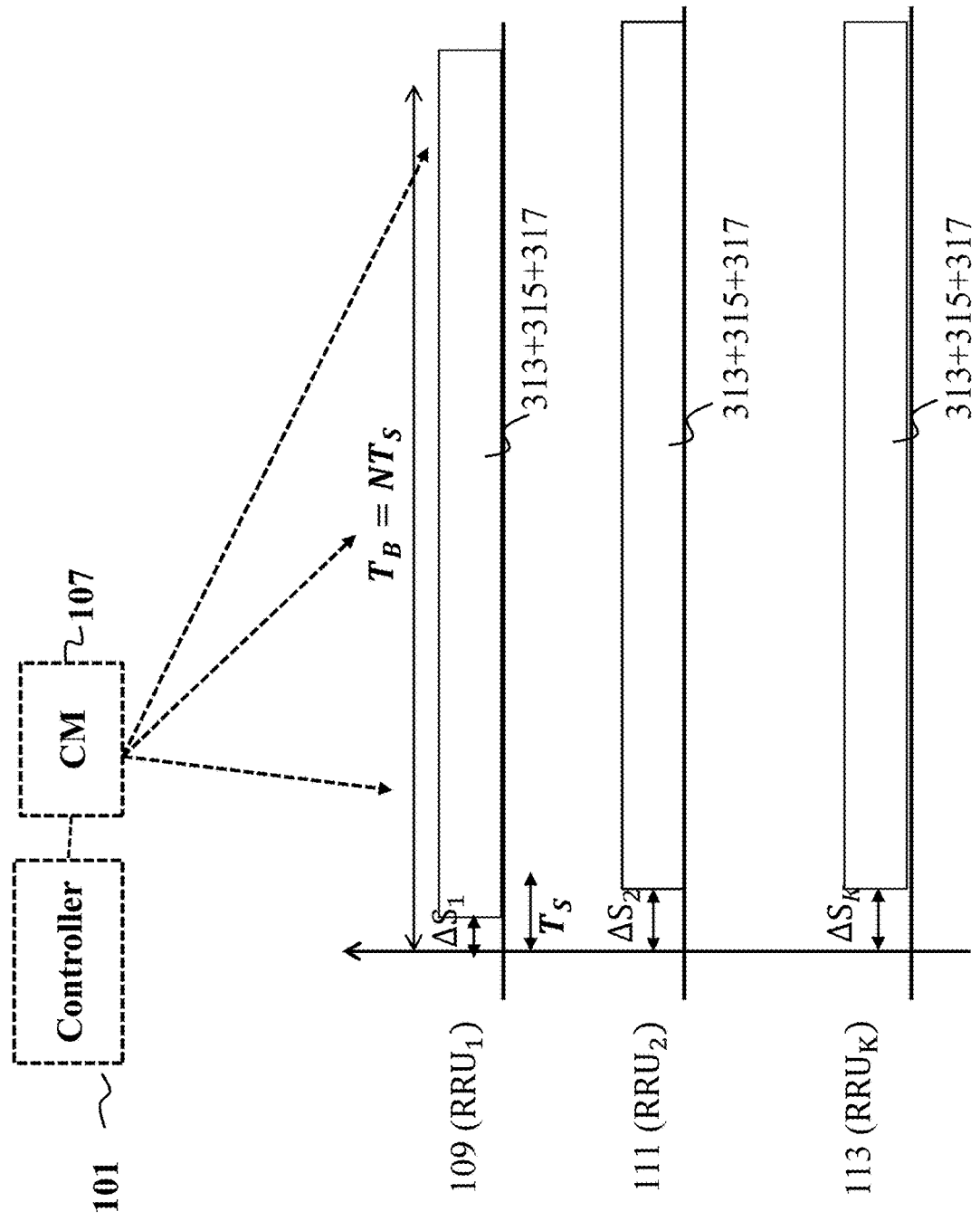
FIG. 3B is a schematic illustrating a step of FIG. 3A, in accordance with an example embodiment.

After receiving the RRU indexing vector representing effective SNRs in ascending order and the maximum RRU Tap Delay from the receiver 103 via a channel 109B, the RRU 109 sends back this information to the CM 107 via a channel 117A FIG. 3A shows a block diagram illustrating a flow chart implementing the minimum cyclic prefix into a message, in accordance with an example embodiment. FIG. 3B is a schematic illustrating step 301 of FIG. 3A, in accordance with an example embodiment. FIG. 3B shows that a different RRU may experience different time synchronization error. The errors are all smaller than one symbol interval $T_s$. For example, $RRU_1$ 109 experiences the time synchronization error $\Delta S_1$, $RRU_2$ 111 experiences the time synchronization error $\Delta S_2$, and $RRU_K$ 113 experiences the time synchronization error $\Delta S_K$.

FIG. 3C is a schematic illustrating the step 303 of FIG. 3A, in accordance with an example embodiment. FIG. 3C shows the CP operation that appends the multiple number of last symbols to the front of the transmission block symbol.

FIG. 3D and FIG. 3E are schematics illustrating the step 307 of FIG. 3A, according to embodiments of the present disclosure. For example, RRU 109 does not apply the CDD due to $\Delta_1=0$ (FIG. 3D), such that RRU 109 only applies the cyclic prefix, that is, a copy of the cyclic prefix, block 313 is appended to the front of block 317.

FIG. 4A to FIG. 4D are schematics illustrating the step 309 of FIG. 3A, according to embodiments of the present disclosure. FIG. 4A illustrates the second $RRU_2$ 111 that applies $\Delta_2=N_P$ for the CDD delay, in accordance with an example embodiment. In FIG. 4A, block 313 is the first cyclic delay. Along with this part, FIG. 4B illustrates right shifted parts of the original transmission block symbol, in accordance with an example embodiment. FIG. 4C illustrates the transmission block structure after applying the CDD delay, in accordance with an example embodiment. In FIG. 4C, the length of block 315 is equal to $N_P$. In FIG. 4D, apply the CP. That is, block 315 is appended to the front of block 313. Thus, FIG. 4D shows actual transmission block symbol from $RRU_2$ 111, in accordance with an example embodiment.

FIG. 5A to FIG. 5D are schematics illustrating the step 311 of FIG. 3A, according to embodiments of the present disclosure. FIG. 5A shows the third $RRU_K$ 113 that applies $\Delta_3=2N_P$ for the CDD delay, in accordance with an example embodiment. In FIG. 5A, blocks 313 and 315 are cyclically delayed. Along with this, FIG. 5B illustrates parts of the original transmission block symbol right shifted by $2N_P$, in accordance with an example embodiment. FIG. 5C illustrates the transmission block structure after applying the CDD delay, in accordance with an example embodiment. Further, a part of 317, that is, 317A, is used as a prefix. Thus, block 317A is appended to the front of block 315. FIG. 5D illustrates actual transmission block symbol from $RRU_K$ 113, in accordance with an example embodiment.

Figure 6:
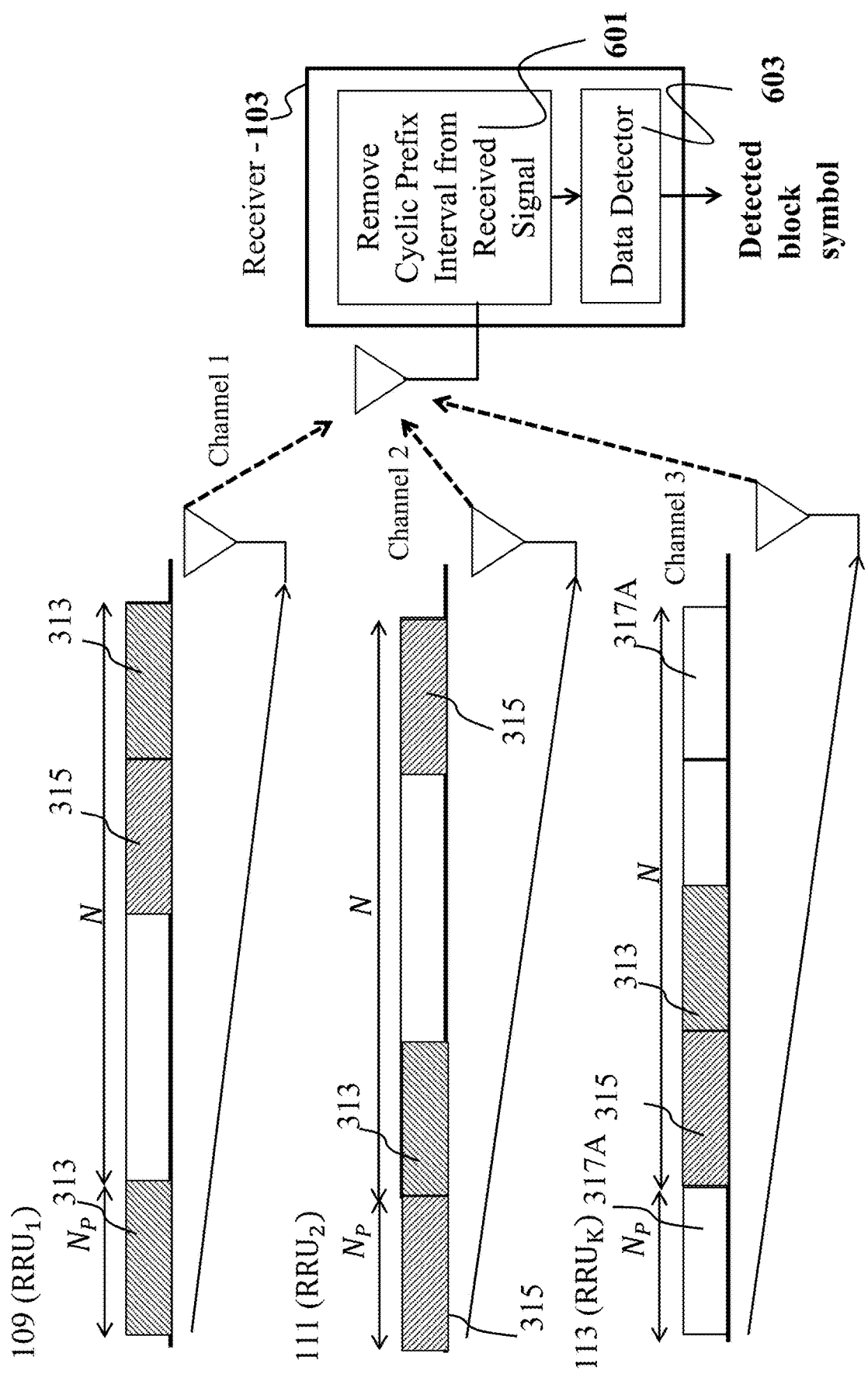
FIG. 6 illustrates a schematic of the receiver 103 receiving the message from different RRUs, in accordance with an example embodiment.

FIG. 6 illustrates a schematic of the receiver 103 receiving the message from different RRUs, in accordance with an example embodiment. FIG. 6 illustrates an example with three RRUs. Each RRU ($RRU_1$, $RRU_2$, $RRU_K$) applied its own CDD delay and then applies cyclic prefix according to the computed minimal CP length determined (as illustrate in step 211 of FIG. 2A). Depending on the RRU index, a final transmission block has a different structure although they are shifted versions of one another. The receiver 103, at first, removes the cyclic prefixed interval in block 601, from the received signal since each RRU applies the cyclic prefix. The receiver 103 further, in block 603, applies the data detector. Then, the detected block symbol can be obtained as output.

Some embodiments are based on a realization that interference occurs due to mismatch of clock synchronization between different elements of the MC-DAS 100. This leads to perturbation of the message received at the receiver 103. To reduce such perturbation of the message a two-way synchronization is implemented using HPTP which is explained further with respect to FIG. 7.

Figure 7:
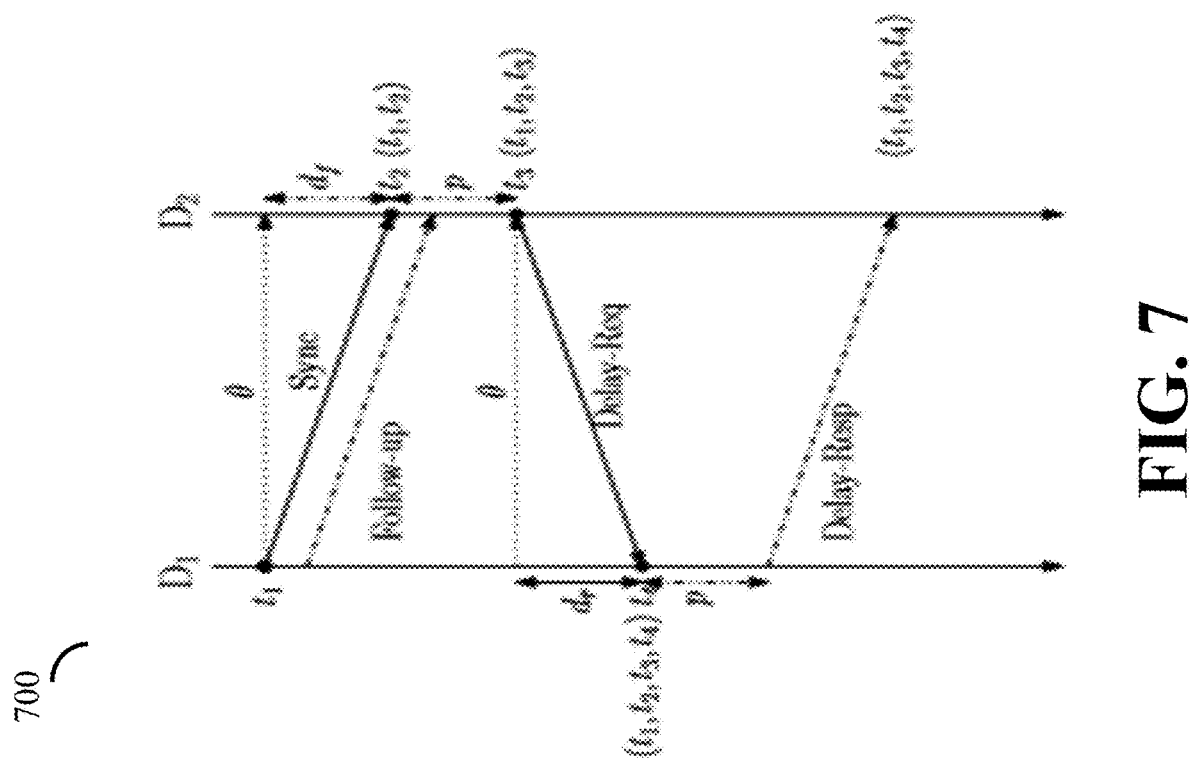
FIG. 7 illustrates a two-way packet exchange synchronization procedure implemented using a hierarchical precision time protocol (HPTP), in accordance with an example embodiment.

FIG. 7 illustrates a two-way packet exchange synchronization procedure 700 implemented using HPTP, in accordance with an example embodiment. In FIG. 7, there is shown a device $D_1$ and a device $D_2$, where the communication is established between device $D_1$ and device $D_2$. Further, there is shown a timestamp in the event message recorded at its transmission and reception. It is assumed that all the nodes (e.g., device $D_1$ and device $D_2$) take a specific processing time e.g., "p". In order to estimate clock offset ($\theta$), HPTP specifies four event messages, such as Sync, Delay-req, Pdelay-Req, and Pdelay-Resp, within which an accurate hardware timestamp is generated and recorded at transmission and reception of its respective messages. Thus, after exchanging two-way packets between device $D_1$ and device $D_2$ (device $D_1$ and $D_2$ may correspond to any two different components of the MC-DAS 100 such as $RRU_{1,2}$ and the receiver RX 103), four hardware timestamps ($t_1$, $t_2$, $t_3$, $t_4$) are available at device $D_1$ via the two-way packet exchange for synchronization. According to available four timestamps, propagation delay (d) and clock offset ($\theta$) are determined as follows:

$$d \approx \frac{(t_4+t_2)-(t_3+t_1)}{2} \text{ and } \theta \approx \frac{(t_3-t_1)-(t_4-t_2)}{2} \quad (1)$$

where it is assumed that a forward propagation delay, $d_f$, is almost equal to the backward propagation delay, $d_r$, i.e., $d_f \approx d_r$. Applying the same procedure, $D_1$ can estimate propagation delay over to another node that supports PTP, $D_3$, so that $D_3$ can be synchronized to $D_2$.

Thus, the controller 101 has a set of propagation delay estimates $\{d_{1,k}\} k=1, \ldots, K$ over cluster $C_1$. Similarly, the controller 101 can estimate propagation delay for other clusters (e.g., $C_2$). Accordingly, a complete set of propagation delays, $\{d_{i,k}\} i=1, 2; k=1, \ldots, K$, is available at the controller 101 by employing the HPTP. Based on the set, $\{d_{i,k}\} i=1, 2, k=1, \ldots, K$, the controller 101 computes the propagation delay corresponding to the signal that arrives first at the receiver RX 103, that is, $$d_{ref} \triangleq \text{Min}(\{d_{i,k}\} i=1,2; k=1, \ldots, K) \quad (2)$$

and further computes a relative propagation delay with respect to $d_{ref}$, that is, $$\delta d_{i,j} \triangleq d_{i,j} - d_{ref} \text{ for } i=1,2; \text{ and } k=1, \ldots, K. \quad (3)$$

Some embodiments utilize distributed cyclic prefixed diversity (dCDD) scheme for distributed CP-SC transmissions to achieve transmit diversity without requiring full CSIT. Depending on the block size, Q, of the transmission symbol, $S \in C^{Q \times 1}$, and the cyclic-prefix (CP) length, $N_{CP}$ equal to $N_{max}$, the maximum number of RRUs that enables ISI-free reception at the receiver RX 105, is determined by $$M = \left\lfloor \frac{Q}{N_{CP}} \right\rfloor,$$

where $\lfloor . \rfloor$ denotes the floor function. The maximum number M of RRUs is also determined based on the length of the message to be transmitted to the receiver RX 103 and a minimum length of the cyclic prefix.

Over Populated DAS

When the number of RRUs in the ith DAS is greater than the maximum number of RRUs required to enable ISI-five reception of the message at the receiver RX 103, i.e., $K_i>M$, the $CM_i$ needs to select only MRRUs (which is the subset of the total RRUs in the DAS cluster) for dCDD operation. The $CM_i$ further transmits the message to the receiver RX 103 using the selected RRUs. Thus, the receiver RX 103 needs to feedback necessary information to the controller 101. Based on available channel estimates, the receiver RX 103 rearranges them according to their strength as follows:

$$\alpha_{i,\langle 1 \rangle} \|h_{i,\langle 1 \rangle}\|^2 \leq \ldots \leq \alpha_{i,\langle K_i \rangle} \|h_{i,\langle K_i \rangle}\|^2 \quad (4)$$

According to equation (4), the receiver RX 103 forms a list specifying the strength order, that is, $D_i \triangleq (\langle 1 \rangle, \ldots, \langle M \rangle)$, and then sends $D_i$ to the controller 101. Via backhaul communications over $b_i$, $CM_i$ can have $D_i$, from which $CM_i$ selects M RRUs indexed by the last M elements of $D_i$, that is, $RRU_{i,\langle K-m+i \rangle}, \ldots, RRU_{i,\langle K \rangle}$. The remaining K-M RRUs are controlled by $CM_i$ to be idle from communication. For the chosen M RRUs, $CM_i$ assigns the CDD delay to $RRU_{i,\langle K-m+m \rangle}$ as follows:

$$\Delta_m = (m-1)N_{CP}, m=1, M \tag{5}$$

Under Populated and Full-Populated DAS

When the number of RRUs in the i the DAS, is less than the maximum number of RRUs required to enable ISI-free reception at the RX 103, i.e. $K_i \leq M$, the $CM_i$ needs to use all $K_i$ RRUs for dCDD operation. The CM; further transmits the message to the receiver RX 103 using the selected RRUs. Thus, the receiver RX 103 does not need to feedback the channel strength order, $D_i$. However, $CM_i$ assigns the CDD delay to $RRU_{i,k}$ as follows:

$$\Delta_k = (k-1)N_{CP}, k=1, \ldots, K_i \tag{6}$$

Thus, for over populated, under populated and full-populated DASs, full CSIT is not required at the controller 101. In summary, for dCDD operation, CM needs to know M, $N_{CP}$, and $D_i$, which are available at each of the CMs by backhaul communication established by the controller 101. Distributed Asynchronous CDD-Joint Transmission (DACDD-JT) for CP-SC Transmissions Some embodiments are based on the assumption that $RRU_{1,1}$'s signal arrives first at the receiver RX 103 in the private network as illustrated in FIG. 1A, which comprises two non-overlapping clusters $C_1$ and $C_2$. Since the controller 101 has propagation delay estimates for its whole network, it can compute the distribution for relative propagation delays with respect to $RRU_{1,1}$'s signal. As an initial interactive process between the controller 101 and receiver RX 103, the controller 101 transmits to the receiver RX 103 via the plurality of clusters $C_1$ and $C_2$.

Further, after the removal of the CP signal and applying post-processing by $d_{1,1}$, the receiver RX 103 receives the composite signal from two clusters ($C_1$ and $C_2$) is given by:

$$r = \left[ \sum_{m=1}^{M} \sqrt{P_T \alpha_{1,\langle K-M+m \rangle}} \prod_{1,\langle K-M+m \rangle} H_{1,\langle K-M+m \rangle} P_{1,\langle K-M+m \rangle} s \right]_{J_1} + \left[ \sum_{m=1}^{M} \sqrt{P_T \alpha_{2,\langle K-M+m \rangle}} \prod_{2,\langle K-M+m \rangle} H_{2,\langle K-M+m \rangle} P_{2,\langle K-M+m \rangle} s \right]_{J_2} + z \tag{7}$$

In equation (7), $[.]_{J_1}$ and $[.]_{J_2}$, respectively represent composite signals transmitted from the first cluster $C_1$ and second cluster $C_2$. In (7), $P_T$ is the transmission power for single carrier transmissions, and $H_{1,\langle K-m+m \rangle} \in \mathbb{C}^{Q \times Q}$ is right circulant matrix determined by $h_{i,\langle K-M+m \rangle}$, where $\mathbb{C}$ denotes a set of complex numbers. In addition, $\Pi_{1,\langle K-m+m \rangle} \in \mathbb{B}^{Q \times Q}$ is right circulant and orthogonal permutation matrix determined by $\delta d_{i,\langle K-m+m \rangle} \in \mathbb{N}_0$. Since full CSIT is not available in the proposed MC-DAS, the same $P_T$ is assigned to all the RRUs. By shifting down $I_{Q \times Q}$ by $\delta d_i, \langle K-m+m \rangle$ rows, $\Pi_{i,\langle K-m+m \rangle}$ can be obtained, where $I_{Q \times Q}$ denotes identity matrix. An additional set of permutation matrices, $\{P_{1,\langle K-m+m \rangle}, \forall i, m\}$, will be defined later. In addition, $s \in \mathbb{C}^{Q \times 1}$ denotes the transmission symbol block. The additive vector noise is denoted by $z \sim CN(0, \sigma^2 \approx I_Q)$. For proper operation, it is assumed that $0 \leq d_{i,\langle K-m+m \rangle} \leq N_{CP}$, so that $0 \leq \delta d_{i,\langle K-m+m \rangle}$ can be achieved.

dACDD for JT

Further, by using the properties of the right circulant matrix, equation (7) can be rewritten as follows:

$$r = \sum_{m=1}^{M} \sqrt{P_T \alpha_{1,\hat{m}}} H_{1,\hat{m}} \prod_{1,\hat{m}} [P_{1,\hat{m}} s]_{J_3} + \sum_{m=1}^{M} \sqrt{P_T \alpha_{2,\hat{m}}} H_{2,\hat{m}} \prod_{2,\hat{m}} [P_{2,\hat{m}} s]_{J_3} + z \tag{8}$$

where $\hat{m} \triangleq \langle K-M+m \rangle$. Furthermore, $[.]_{J_3}$ and $[.]_{J_4}$ correspond to local operation respectively performed at $RRU_{1,\hat{m}}$ and $RRU_{2,\hat{m}}$. To enable ISI-free reception at the receiver RX 103, it is required that $\Pi_{1,\hat{m}} P_{1,\hat{m}}$ and $\Pi_{2,\hat{m}} P_{2,\hat{m}}$ are orthogonal and right circulant matrices, and meet either the random CDD delay assignment or linear CDD delay assignment for $RRU_{i,\hat{m}}$. Accordingly, $\delta T_{i,\hat{m}} \in \mathbb{N}_0$ can be readily obtained that meets the condition: $\Delta_m = \delta d_{i,\hat{m}} + \delta T_{i,\hat{m}}$. For operation $[.]_{J_3}$ can be simply accomplished. Similar operation is conducted for $[.]_{J_4}$. Thus, $P_{1,\hat{m}}$ and $P_{2,\hat{m}}$), can be obtained from $I_Q$ by circularly sifting down respectively by $\delta T_{1,\hat{m}}$ and $\delta T_{2,\hat{m}}$.

Further, ISI caused by a variant propagation delay and multiple transmissions can be removed by a series of circular shifting operations that are respectively performed by the RRUs, and caused by propagation. Thus, dACDD is an extensive version of dCDD allowing the distribution of propagation delays over the private network. However, for proper dACDD operation, the controller 101 is required to know $\{d_{i,\hat{m}}\}_{i=1,2;m=1,\ldots,M}$ and $\{\delta h_{i,\hat{m}}\}_{i=1,2;m=1,\ldots,M}$. However, for proper dACDD operation, the controller 101 is required to know $\{d_{i,\hat{m}}\}_{i=1,2;m=1,\ldots,M}$. However, due to the use of PTP, an additional feedback is not necessary from the receiver RX 103.

Some embodiments are based on the realization that in contrast to the general multiple transmissions, multiple CP-SC transmissions do not cause any ISI when dACDD is integrated with JT. Thus, it is not necessary to use multiple orthogonal channels to avoid ISI. Accordingly, ISI is avoided by use of dACDD in an efficient manner.

For instance, it is assumed that there are two clusters. For cluster 1, $Q=8$, $N_{1,1}=2$, $N_{1,2}=3$, $d_{1,1}=1$, $d_{1,2}=3$. Similarly, for cluster 2, $Q=8$, $N_{2,1}=4$, $N_{2,2}=3$, $d_{2,1}=2$, $d_{2,2}=4$. Then $N_{CP}=4$, $\delta d_{1,1}=0$, $\delta d_{1,2}=2$, $\delta d_{2,1}=1$, and $\delta d_{2,2}=3$, so that $\delta T_{1,1}=0$, $\delta T_{1,2}=2$, $\delta T_{2,1}=7$, $\delta T_{42}=1$. Based on these computations, $$H_{1,eq} \triangleq \sum_{m=1}^{2} H_{1,m} \prod_{i,m} P_{1,m}$$

and $H_{2,eq} \triangleq \sum_{m=1}^{2} H_{2,m} \Pi_{2,m} P_{2,m}$ are respectively given by equation (9) as follows $$H_{1,eq} = \begin{bmatrix} h_{1,1}(1) & 0 & h_{1,2}(3) & h_{1,2}(2) & h_{1,2}(1) & 0 & 0 & h_{1,1}(2) \\ h_{1,1}(2) & h_{1,1}(1) & 0 & h_{1,2}(3) & h_{1,2}(2) & h_{1,2}(1) & 0 & 0 \\ 0 & h_{1,1}(2) & h_{1,1}(1) & 0 & h_{1,2}(3) & h_{1,2}(2) & h_{1,2}(1) & 0 \\ 0 & 0 & h_{1,1}(2) & h_{1,1}(1) & 0 & h_{1,2}(3) & h_{1,2}(2) & h_{1,2}(1) \\ h_{1,2}(1) & 0 & 0 & h_{1,1}(2) & h_{1,1}(1) & 0 & h_{1,2}(3) & h_{1,2}(2) \\ h_{1,2}(2) & h_{1,2}(1) & 0 & 0 & h_{1,1}(2) & h_{1,1}(1) & 0 & h_{1,2}(3) \\ h_{1,2}(3) & h_{1,2}(2) & h_{1,2}(1) & 0 & 0 & h_{1,1}(2) & h_{1,1}(1) & 0 \\ 0 & h_{1,2}(3) & h_{1,2}(2) & h_{1,2}(1) & 0 & 0 & h_{1,1}(2) & h_{1,1}(1) \end{bmatrix},$$

(9)

$$H_{2,eq} = \begin{bmatrix} h_{2,2}(1) & 0 & h_{2,1}(3) & h_{2,2}(2) & h_{2,1}(1) & h_{2,2}(4) & h_{2,2}(3) & h_{2,2}(2) \\ h_{2,2}(2) & h_{2,2}(1) & 0 & h_{2,1}(3) & h_{2,1}(2) & h_{2,1}(1) & h_{2,2}(4) & h_{2,2}(3) \\ h_{2,2}(3) & h_{2,2}(2) & h_{2,2}(1) & 0 & h_{2,1}(3) & h_{2,1}(2) & h_{2,1}(1) & h_{2,2}(4) \\ h_{2,2}(4) & h_{2,2}(3) & h_{2,2}(2) & h_{2,2}(1) & 0 & h_{2,1}(3) & h_{2,1}(2) & h_{2,1}(1) \\ h_{2,1}(1) & h_{2,2}(4) & h_{2,2}(3) & h_{2,2}(2) & h_{2,2}(1) & 0 & h_{2,1}(3) & h_{2,1}(2) \\ h_{2,1}(2) & h_{2,1}(1) & h_{2,2}(4) & h_{2,2}(3) & h_{2,2}(2) & h_{2,2}(1) & 0 & h_{2,1}(3) \\ h_{2,1}(3) & h_{2,1}(2) & h_{2,1}(1) & h_{2,2}(4) & h_{2,2}(3) & h_{2,2}(2) & h_{2,2}(1) & 0 \\ 0 & h_{2,1}(3) & h_{2,1}(2) & h_{2,1}(1) & h_{2,2}(4) & h_{2,2}(3) & h_{2,2}(2) & h_{2,2}(1) \end{bmatrix}$$

Here, $h_{i,m}(l)$ denotes the lth element of $h_{i,m}$. Further, from the properties of the right circulant matrix, $H_{1,eq}$ and $H_{2,eq}$ are respectively determined by the first column vectors, that is, $H_{1,eq} = RC([h_{1,1}^T, 0_{1\times1}^T, h_{1,2}^T, 0_{1\times1}^T]^T)$ and $H_{2,eq} = RC([h_{1,1}^T, 0_{1\times1}^T, h_{1,2}^T, 0_{1\times1}^T]^T)$. From equation (9), it can be observed that elements do not overlap each other in the equivalent channel matrices, so that dACDD enables a new ISI-free CP-SC transmission from a plurality of clusters. It has been verified that performance of the communication system with CP-SC transmissions in mainly determined by the magnitude of the first column vector of the equivalent channel matrix. Thus, another system whose equivalent channel matrix, represented by $H_{3,eq}RC([h_{2,1}^T, 0_{1\times1}^T, h_{2,2}^T, 0_{1\times1}^T]^T)$, will have the same performance as the system with $H_{2,eq}$. For example, $H_{3,eq}$ can be obtained by applying different CDD delays as follows: $\delta T_{2,1} = 3$, $\delta T_{2,2} = 5$.

Spectral Efficiency of JT by Asynchronous MC-DACDD

Some embodiments are based on the realization that for asynchronous signal reception at the receiver RX 103, ISI-free reception can be possible with the aid of MC-dACDD. Thus, the achievable signal-to-noise ratio (SNR) realized by JT is given by:

$$\gamma_{JT} = \rho \left( \sum_{m=1}^{M} \alpha_{1,\tilde{m}} \|h_{1,\tilde{m}}\|^2 + \sum_{m=1}^{M} \alpha_{1,\hat{m}} \|h_{1,\hat{m}}\|^2 \right) = \gamma_{JT,1} + \gamma_{JT,2} = \frac{\rho_s}{\sigma_Z^2} \quad (10)$$

where $$\rho_s = P_T \left( \sum_{m=1}^{M} \alpha_{1,\tilde{m}} \|h_{1,\tilde{m}}\|^2 + \sum_{m=1}^{M} \alpha_{1,\hat{m}} \|h_{1,\hat{m}}\|^2 \right)$$

and $$\gamma_{JT,i} \triangleq \rho \sum_{m=1}^{M} \alpha_{i,m} \|h_{i,m}\|^2$$

with $$\rho \triangleq \frac{P_T}{\sigma_Z^2}.$$

The SNR realized by JT in equation (10) can be achieved when $\{h_{1,\tilde{m}}, \forall m\}$ and $\{h_{2,\hat{m}}, \forall m\}$ are independent of each other, and $H_{1,eq}$ and $H_{2,eq}$ are right circulant, the signal power $\rho_S$, realized at the receiver RX 103, is determined by the summation of squared Euclidean norms of first column vectors of them. This signal power can be achieved when a type of maximum likelihood detector (MLD) is applied at the receiver RX 103. Thus, the achievable SNR can be given by equation (10).

For over populated DAS, the CM selects only M RRUs referring to the channel strength. Thus, the order statistics are employed in the expression for the SNR.

Some embodiments are based on the realization that by compensating different signal arrival times at the receiver RX 103, the MC-dACDD makes JT provide the same benefit as maximum ratio combining at the receiver RX 103 without full CSIT at the controller 101 and CMs.

Some embodiments are based on the realization that when the block size of s is the same, by combining two or more orthogonal carrier channels as an aggregated channel, a higher spectral efficiency can be achieved due to an efficient use of fragmented spectrum. Because by using a set of one or more non-overlapping frequency bands, an additional ISI-free JT is achievable with the aid of MC-dACDD. Thus, a greater SNR can be obtained, which eventually increases the spectral efficiency.

Some embodiment based on the realization that due to the use of dACDD based JT, the proposed MC-DAS results in the SNR, $\gamma_{JT}$ realized at the receiver RX 103, whose moment geometric function (MGF) is given by:

$$M_{\gamma_{JT}}(s) = \sum_{\substack{n_1, \ldots, n_M \\ n_1 \neq \ldots \neq n_M}} \sum_{\substack{\tilde{n}_1, \ldots, \tilde{n}_M \\ \tilde{n}_1 \neq \ldots \neq \tilde{n}_M}} \prod_{k=1}^{M} (M + 1 - k)^{-e_k} \quad (11)$$

-continued $$\Gamma(e_k) \prod_{k=1}^{M} (M+1-k)^{-\tilde{e}_k} \Gamma(\tilde{e}_k) \left[ \prod_{k=1}^{2M} (s+Q_k)^{-E_k} \right]_{J_5}$$

where $Q_k = [q_1, \ldots, q_M, \tilde{q}_1, \ldots, \tilde{q}_M]$, and $E_k = [e_1, \ldots, e_M, \tilde{e}_1, \ldots, \tilde{e}_M]$.

Therefore, as either M or $N_{max}$ inverse, the inverse MGF (IMGF) based on the partial fraction (PF) becomes unreliable, thus, it is necessary to develop a more reliable expression for $[.]_{J_5}$.

In another embodiment, a reliable expression for $[.]_{J_5}$, a part of the MGF, is given by equation (12) below:

$$\prod_{k=1}^{2M} (s+Q_k)^{-E_k} = \sum_{l=1}^{N_1} \delta_l (b_l)^{-l} (1/(b_l+s))^{-G_d-l} \quad (12)$$

where $$G_d \triangleq \sum_{k=1}^{2M} E_k, \quad b_l \triangleq \min\left(\frac{1}{Q_1}, \ldots, \frac{1}{Q_{2M}}\right),$$

$N_1$ denotes an upper limit summation, and $$\delta_l \triangleq \frac{1}{l} \sum_{i=1}^{l} i r_i \delta_{l-i}$$

with $$\delta_0 = 1 \text{ and } r_i = \sum_{j=1}^{2M} E_j (1 - b_l Q_i)^j.$$

The equation (12) provided the MGF expressed by the weighted sum of $N_l + 1$ terms, each of which is proportional to $$\left(\frac{1}{b_l} + s\right)^{-G_d - l}.$$

Similarly, the CDF of $\gamma_{JT}$ can be expressed by a finite number of gamma distributions. Its expression is given by:

$$F_{\gamma_{JT}}(x) = \quad (13)$$

$$1 - \sum_{\substack{n_1, \ldots, n_M \\ n_1 + \ldots + n_M}} \sum_{\substack{\tilde{n}_1, \ldots, \tilde{n}_M \\ \tilde{n}_1 + \ldots + \tilde{n}_M}} \prod_{k=1}^{M} (M+1-k)^{-e_k} \Gamma(e_k) \prod_{k=1}^{M} (M+1-k)^{-\tilde{e}_k}$$

$$\Gamma(\tilde{e}_k) \sum_{l=0}^{N_1} \delta_l (b_l)^{-l} \frac{(b_l)^{G_d+l}}{\Gamma(G_d+l)} \Gamma_U(G_d+l, x/b_l)$$

where $\Gamma(.)$ and $\Gamma_U(.,.)$ respectively denote complete gamma and incomplete upper-gamma functions.

where $\Gamma(.)$ and $\Gamma_U(.,.)$ respectively denote complete gamma and incomplete upper-gamma functions.

Further, $b_l$, $G_d$, and $N_1$ are key parameters in specifying the distributions of controls an approximation accuracy of the distributions in representing it by a finite number of gamma distributions. Equation (12) provides the MGF for two clusters. Thus, for a general number of $N_D$ clusters, the MGF for $\gamma_{JT}$ is proportional to the following expression $$\prod_{k=1}^{N_D M} ((s+Q_k))^{-E_k} = \sum_{l=0}^{N_2} \delta_l (b_l)^{-l} (1/(b_l+s))^{-G_d-l} \quad (14)$$

where $$G_d \triangleq \sum_{j=1}^{N_D M} E_k, \quad b_l \triangleq$$

$\min(1/Q_1, \ldots, 1/Q_{N_D M}))$, and $$\delta_l \triangleq \sum_{i=1}^{l} i r_i \delta_{l-1}$$

with $$\delta_0 = 1 \text{ and } r_i = \sum_{j=1}^{N_D M} E_j (1 - b_l Q_i)^j.$$

Similar to $Q_k$ and $E_k$ corresponding to two clusters, they can be derived for $N_D$ clusters. To achieve the same level of an approximation accuracy, it is required that $N_2 \approx N_D N_1$. Thus, according to (14), the distributions of $\gamma_{JT}$ realized by more than two clusters can be readily derived.

Spectral Efficiency (SE)

Based on equation (10), the spectral efficient of the proposed JT is given by $$SE = \frac{1}{\log(2)} \int_0^\infty \frac{1 - F_{\gamma_{JT}}(x)}{1+x} dx \quad (2)$$

By using distribution of $\gamma_{JT}$, the spectral efficiency is determined as follows:

The achievable spectral efficiency of the proposed JT realized by MC-dACDD is given by $$SE = \frac{1}{\log(2)} \quad (16)$$

$$\sum_{\substack{n_1, \ldots, n_M \\ n_1 + \ldots + n_M}} \sum_{\substack{\tilde{n}_1, \ldots, \tilde{n}_M \\ \tilde{n}_1 + \ldots + \tilde{n}_M}} \prod_{k=1}^{M} (M+1-k)^{-e_k} \Gamma(e_k) \prod_{k=1}^{M} (M+1-k)^{-\tilde{e}_k}$$

$$\Gamma(\tilde{e}_k)(b_l)^{G_d} \left[ \sum_{l=0}^{N_1} \frac{\delta_l}{\Gamma(G_d+l)} G_{2,3}^{3,1}\left(1/b_l \,\bigg|\, \begin{matrix} 0, 1 \\ G_d+l, 0, 0 \end{matrix}\right) \right]$$

where $$G_{p,q}^{m,n}\left(t\left|\begin{array}{l}a_1,\ldots,a_n,a_{n+1},\ldots,a_p\\b_1,\ldots,b_n,b_{n+1},\ldots,b_p\end{array}\right.\right)$$

denotes the Meijer G-function.

Outage Probability

Since the closed-form expression for the CDF is available, the outage probability can be readily obtained. At an outage SNR, $o_{th}$, the outage probability is given by:

$$OP = F_{\chi_{JT}}(o_{th}) \quad (17)$$

When the DAS is under populated, the MC-dACDD based JT achieves the asymptotic diversity gain in the high SNR region as follows:

$$G_d = \sum_{j=1}^{K_1} N_{1,j} + \sum_{j=1}^{K_2} N_{2,j} \quad (18)$$

The same asymptotic diversity gain can be achieved for over populated DAS. Thus, a more number of non-overlapped clusters make JT achieve greater diversity gain in proportion to the number of clusters when the DASs do not cause inter-cluster and intra-cluster ISI at the receiver. In addition, as the DAS is more populated a greater diversity gain is achieved.

Figure 8:
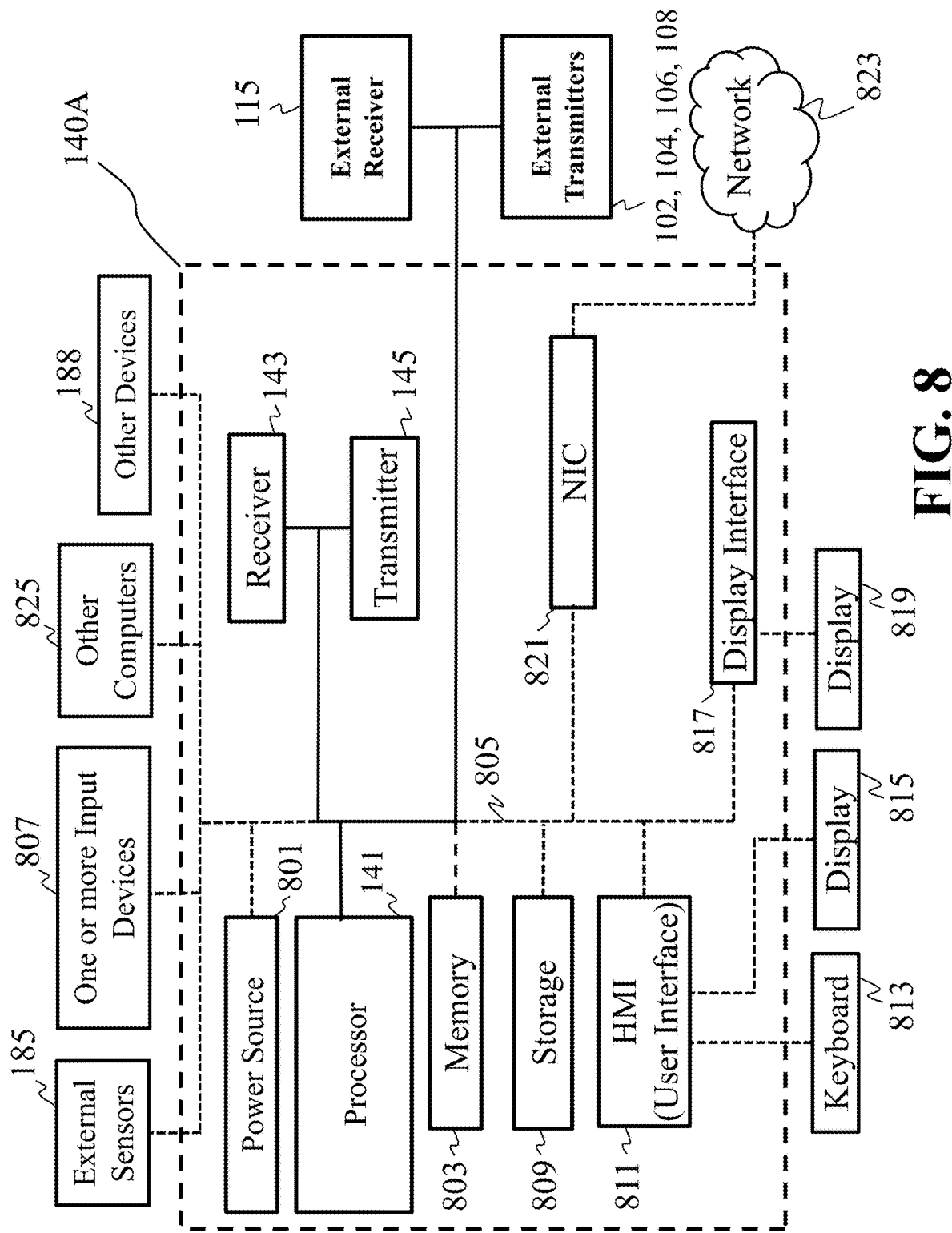
FIG. 8 illustrates a block diagram of some components that can be used in various configurations to implement the controller for controlling the communication system, in accordance with an example embodiment.

FIG. 8 illustrates a block diagram of some components that can be used in various configurations to implement the controller 101 for controlling the communication system, in accordance with an example embodiment. The processor 141 may be any type of processor configured for communication and network system operations. The controller 101 can include a power source 801. The power source 801 may be located inside or outside the controller 101, depending upon the application. The processor 141 can be configured to execute stored instructions, as well as can be in communication with a memory 803 that stores instructions that are executable by the processor 141. The processor 141 can be a single core processor, a multi-core processor, a computing cluster, or any number of other configurations. The coordination processor 141 is connected through a bus 805 to one or more input and output devices 807. The memory 803 can include random access memory (RAM), read only memory (ROM), flash memory, or any other suitable memory systems. It is contemplated the processor can be a coordination processor responsible for determining and communicating the parameters such as a number of transmitters, CDD delays, and CP size.

Still referring to FIG. 8, the controller 101 can also include a storage device 809 adapted to store supplementary data and/or software modules used by processor 141. For example, the storage device 809 can store historical data relating to similar different types of communication networks and systems, related to for example, CP configurations, transmitter configurations, receiver configurations, synchronization error data, etc., among other things. The storage device 809 can include a hard drive, an optical drive, a thumb-drive, an array of drives, or any combinations thereof.

A human machine interface (HMI or User Interface) 811 within the controller 101 can connect the controller 101 to a keyboard 813 and display device 815. The controller 101 can be linked through the bus 805 to a display interface 817 adapted to connect to a display device 819, wherein the display device 819 can include a computer monitor, camera, television, projector, or mobile device, among others.

A network interface controller (NIC) 821 is adapted to connect through the bus 805 to a network 823. The communication data or related communication data, among other things, can be rendered on a display device, imaging device, and/or printing device.

The communication data or related communication data, among other things, can be transmitted over a communication channel of the network 823, and/or stored within the storage system 809 for storage and/or further processing. Further, the communication data or related communication data may be received wirelessly or wire from a receiver 143 or transmitted via a transmitter 145 wirelessly or wire, the receiver 143 and transmitter 145 are both connected through the bus 805 to the controller 101.

The controller 101 may be connected to external sensors 825. For example, the external sensors 825 may include sensors for, speed, direction, air flow, weather conditions, etc. The controller 101 may be connected to other external devices 827.

Verification of the Analytic Spectral Efficiency (SE)

We consider several frequency selective fading channel parameters for two clusters depending on the respective number of RRUs, $K_1$ and $K_2$. For notation purpose, we use $H_1 = \{N_{1,j}, j=1, \ldots, K_1\}$ for $C_1$ and $H_2 = \{N_{2,j}, j=1, \ldots, K_2\}$ for $C_2$.

We assume the following scenarios for the performance verification.

Figure 9:
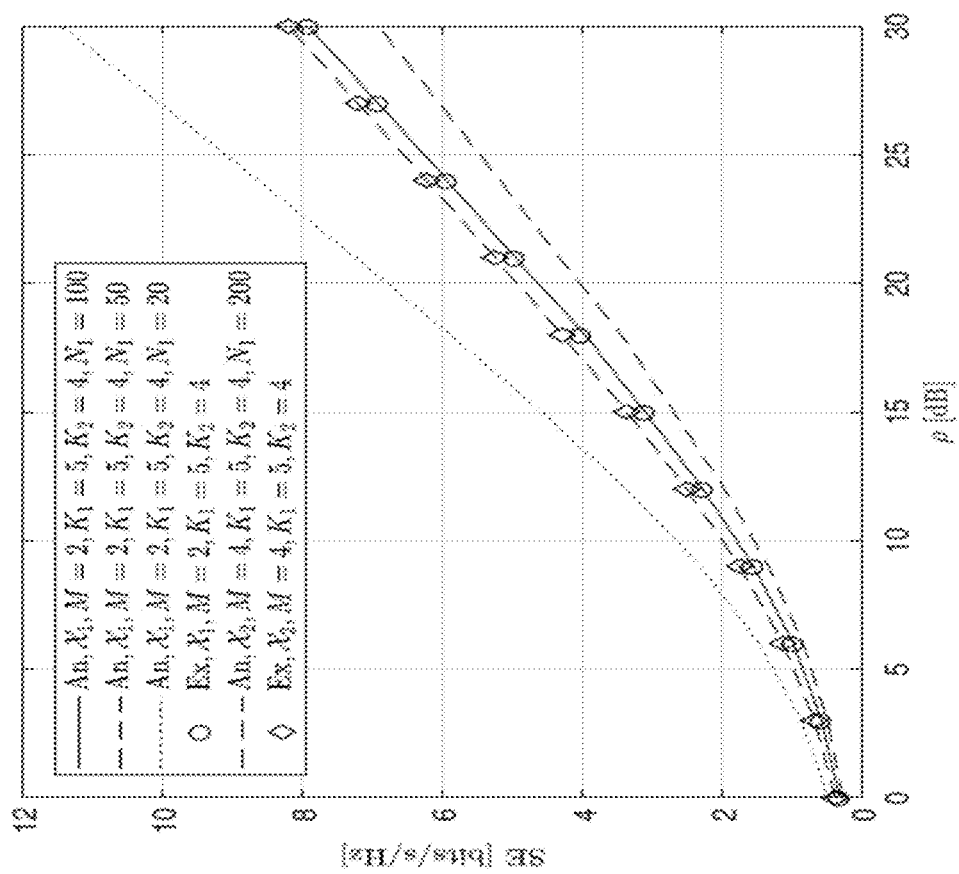
FIG. 9 illustrates spectral efficiency for various system and channel parameters, in accordance with an example embodiment.

Scenario $X_1$: $H_1 = \{2, 3, 4, 2, 3\}$ and $H_2 = \{3, 2, 3, 3\}$
Scenario $X_2$: $H_1 = \{3, 4, 2, 3, 2\}$ and $H_2 = \{3, 2, 3, 3\}$
Scenario $X_3$: $H_1 = \{2, 3, 4, 2, 3, 4\}$ and $H_2 = \{3, 2, 3, 3, 4\}$
Scenario $X_4$: $H_1 = \{2, 3, 4\}$ and $H_2 = \{3, 2, 3\}$
Scenario $X_5$: $H_1 = \{3, 4, 5, 3, 4, 5\}$ and $H_2 = \{5, 4, 5, 5, 5\}$ FIG. 9 illustrates spectral efficiency for various system and channel parameters, in accordance with an example embodiment. Initially, the analytically derived SE for two over populated systems is verified. To that end, the first system with scenario $X_1$ assumes that dACDD supports two RRUs, while five and four RRUs exist in the cluster $C_1$ and the cluster $C_2$, respectively. For the second system with scenario $X_2$, dACDD supports four RRUs, while five and four RRUs exist in the cluster $C_1$ and the cluster $C_2$, respectively. For two over populated systems, FIG. 9 shows an accuracy of the analytically derived SE comparing with the exact SE. FIG. 9 also shows that if $N_1$ is not large enough, an approximation, which is used in equation (12), does not provide an enough accuracy. Thus, in the sequel, a large value for $N_1$ is used without a specific description for it. In general, as M increases, a larger $N_1$ is required to obtain a very reliable analytic SE.

B. Comparisons of SEs with Respect to a Single Cluster

Figure 10:
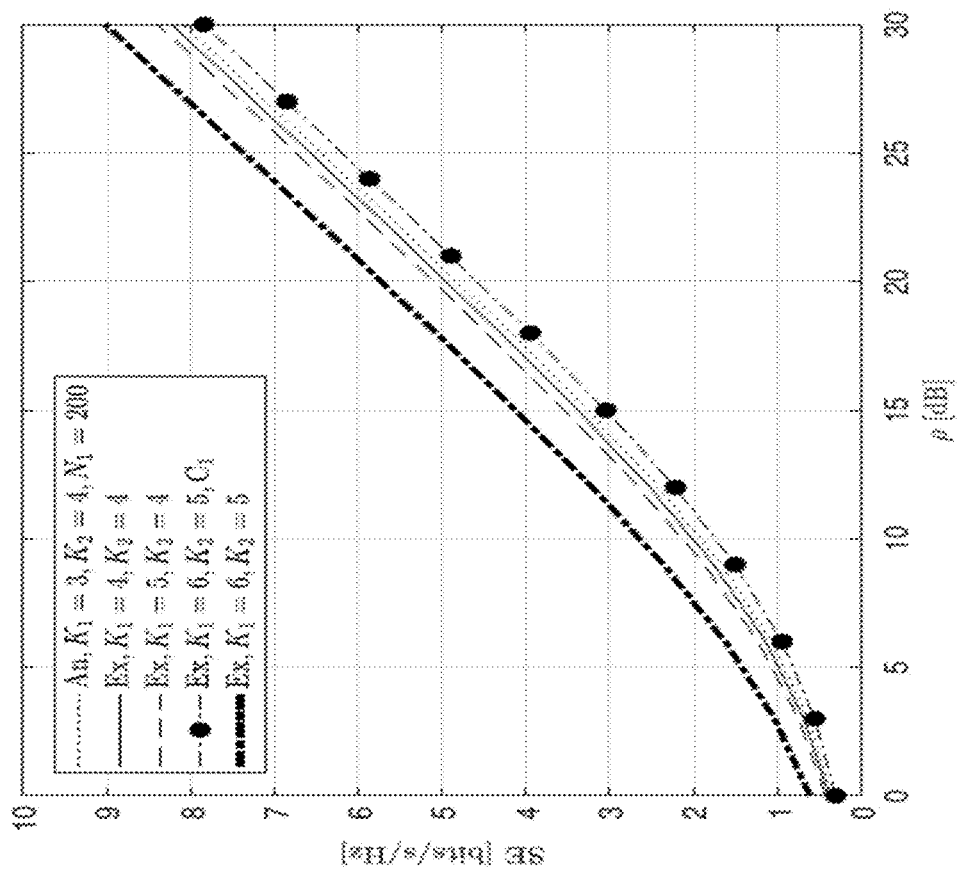
FIG. 10 illustrates spectral efficiency for various overpopulated of DASs with scenario $X_3$, in accordance with an example embodiment.

FIG. 10 illustrates spectral efficiency for various overpopulated of DASs with scenario $X_3$, in accordance with an example embodiment. In this simulation, it is assume that M=4. For the first four fading channel parameters of scenarios $X_1$-$X_4$ with the cluster $C_1$ and M=4, it can be categorized that:

Under populated DAS ($K_1 < M$): scenario $X_4$.
Over populated DAS ($K_1 > M$): scenarios $X_1$, $X_2$, and $X_3$.
In contrast, the second DAS deployed in the cluster $C_2$ is full-populated with scenarios $X_1$, $X_2$, and $X_4$, i.e., $K_2 = M$. When DAS is either under populated or full-populated, the CMs make full use of RRUs for dACDD. In FIG. 10, scenario $X_3$ is mainly used with various over-populated DASs. Further, from FIG. 10 the following facts are evident:

As the DAS is more over populated, a greater SE can be achieved.

As the number of clusters increases, a greater SE can be achieved. However, more tight restriction on the number of dCDD RRUs exists due to different frequency selective fading severity across deployed clusters.

Impact of the Number of Multipath Components and M on the SE

Figure 11:
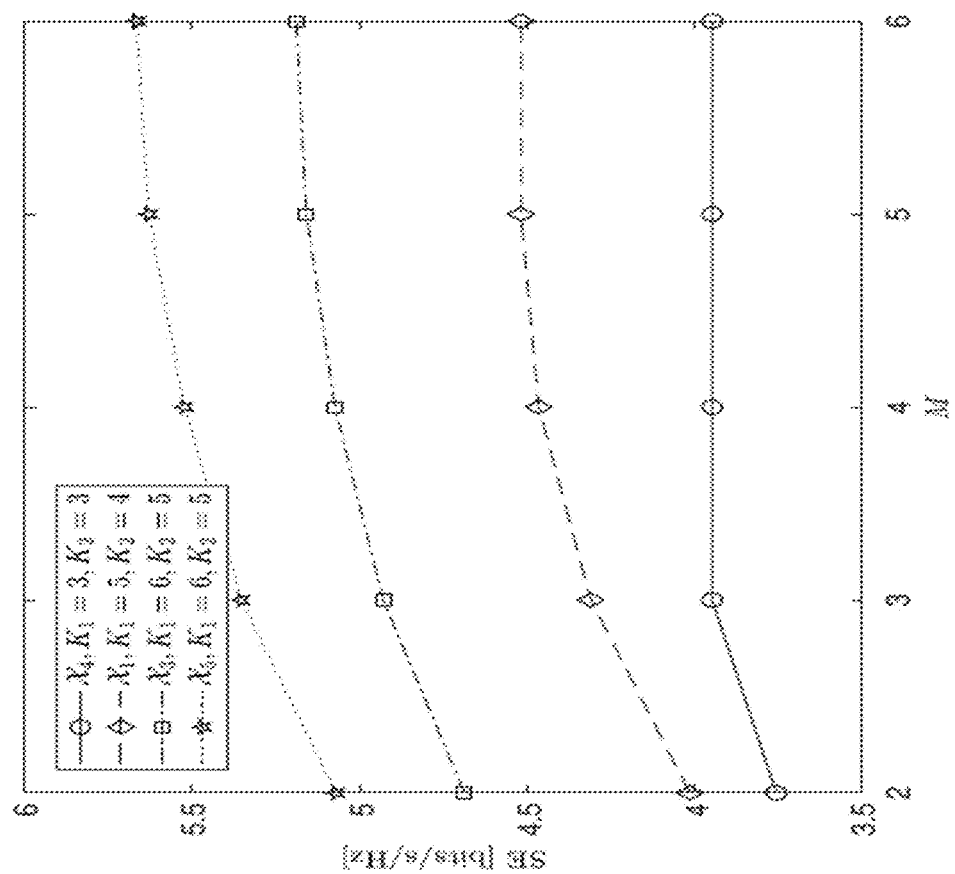
FIG. 11 illustrates spectral efficiency for various values of remote radio units and different numbers of multipath components, in accordance with an example embodiment.

FIG. 11 illustrates spectral efficiency for various values of M and different numbers of multipath components, in accordance with an example embodiment. At a fixed 18 dB SNR, FIG. 11 shows the SE for various system and channel parameters. For under populated and over populated DASs, the impact of M on the SE is investigated.

For a given $K_1$ and $K_2$, as M increases, the DAS becomes less over populated. Although the SE increases in proportion to M, the growth rate of the SE decreases.

As $K_1$ or $K_2$ greater, the growth rate of the SE increases. For example, ($K_1$=6, $K_2$=5) vs ($K_1$=5, $K_2$=4).

As the number of multipath components increases, a greater SE is achieved. For example, scenarios $X_3$ vs $X_5$.

In an example embodiment, the MC-DAS communication system may be used for communication between a controller and a plurality of robots in a factory or a warehouse. For example, the robots may be used in the warehouse to carry heavy goods from one place to another inside the warehouse. In order to achieve this, every robot carrying the goods should be accurately communicated with the locations inside the warehouse where the robots should carry the goods. To that end, a plurality of spatially distributed transceivers or RRUs may be arranged inside the warehouse. The plurality of RRUs may be clustered together to form a plurality of clusters, where each cluster forms the distributed antenna system. Further, each cluster is configured to comprise one transceiver to that may be configured as a cluster master (CM). Cluster masters (CMs) of each cluster are configured to directly communicate with the controller. The CMs further directly communicate with RRUs in their corresponding cluster (as illustrated in FIG. 1A).

Further, each robot of the plurality of robots is configured to obtain a message comprising information such as location information from the controller via the plurality of clusters. The controller may be configured to transmit the message to each robot of the plurality of robots. To achieve this, the controller, the CMs, and RRUs are synchronized using HPTP. After synchronization, the message transmitted by the controller is received by at least one CM of the plurality of the CMS, and is further forwarded to the RRUs in their corresponding cluster which add minimum cyclic delay prefix. Finally, a target robot of the plurality of the robots may receive the message from the plurality of RRUs. The robot may remove the cyclic prefix and obtain the original message transmitted by the controller without any ISI interference.

Figure 12:
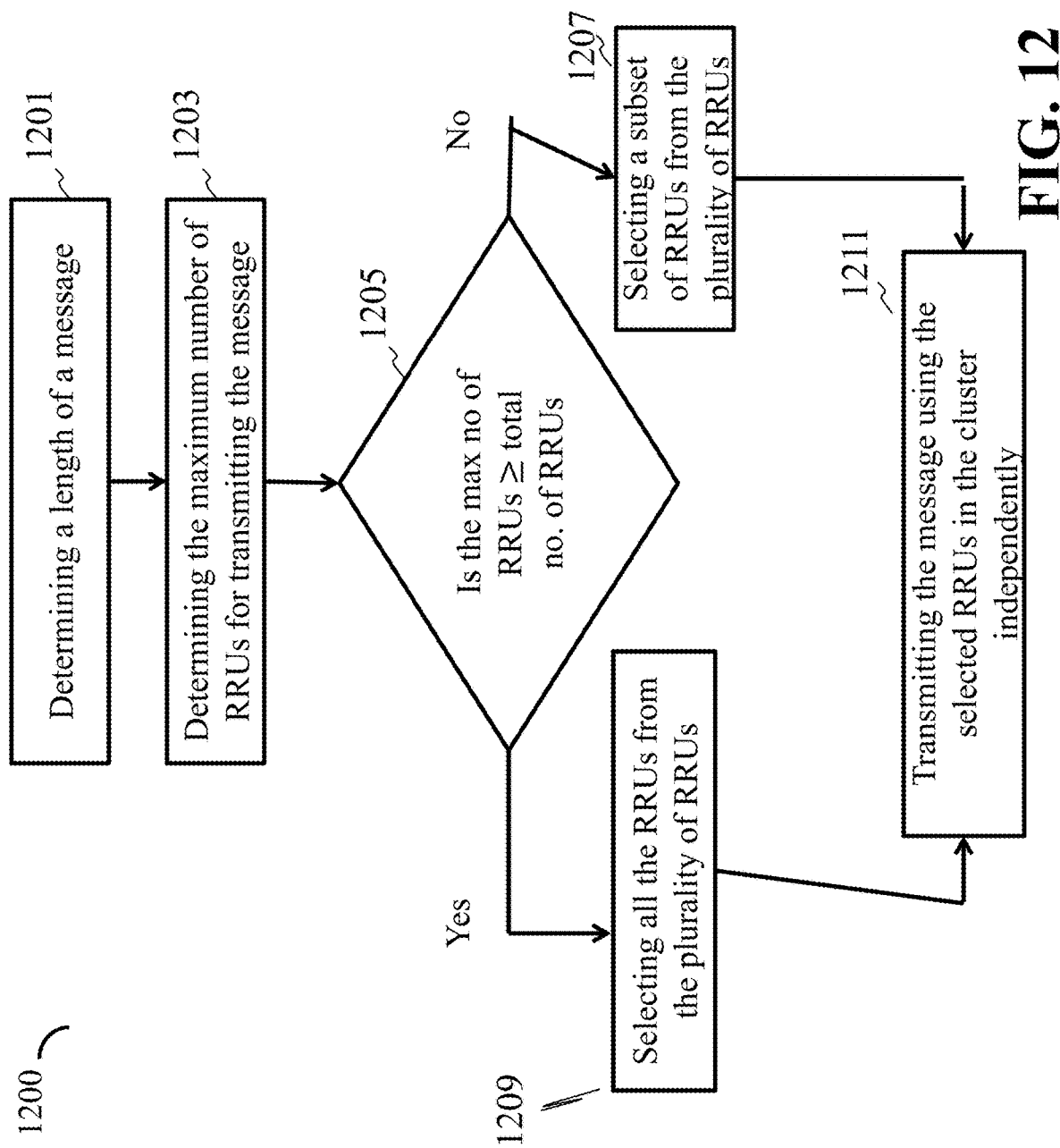
FIG. 12 illustrates a method for transmitting a message in the MC-DAS communication system, in accordance with an example embodiment.
Figure 13:
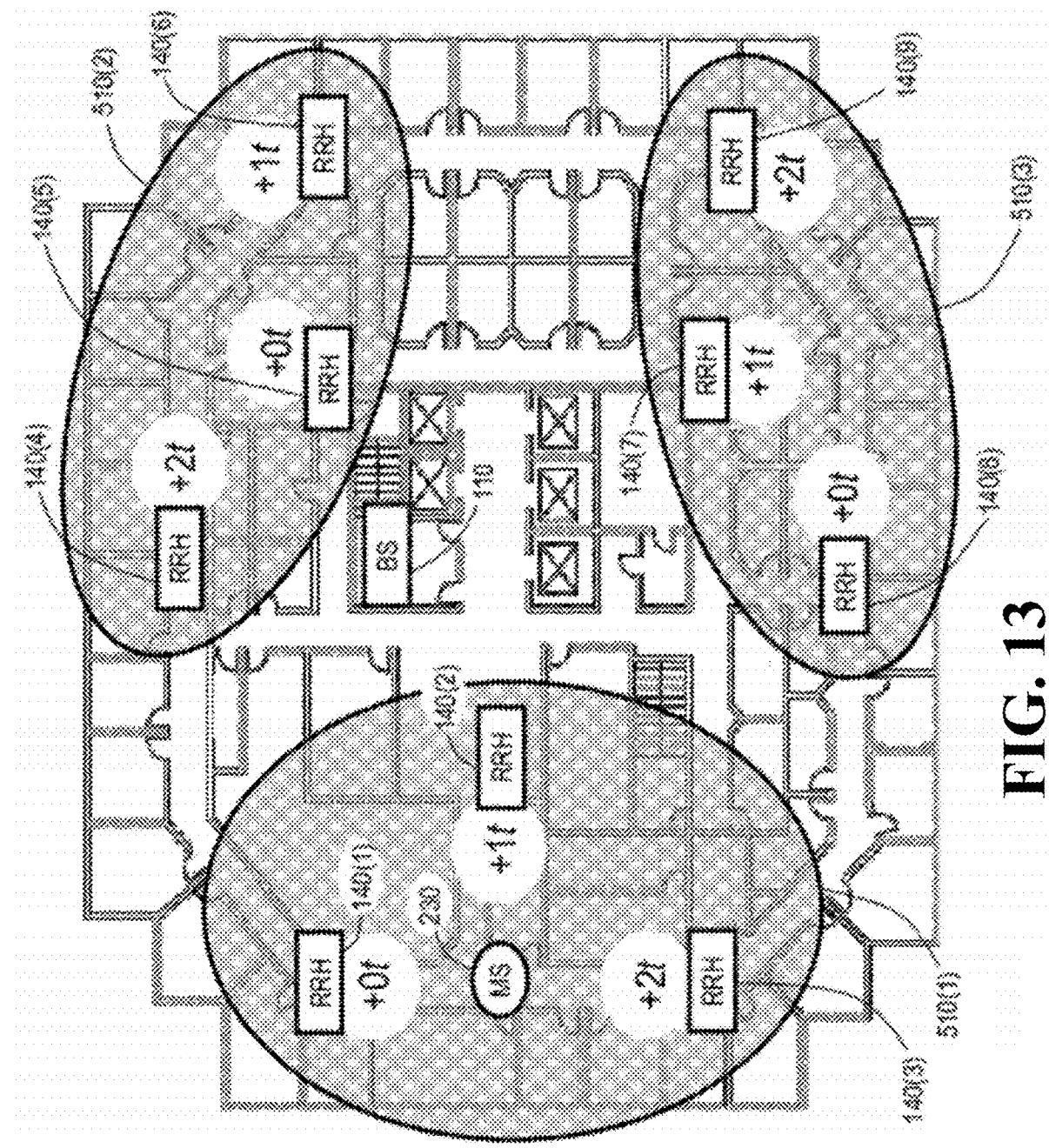

FIG. 12 illustrates a method 1200 for transmitting a message in the MC-DAS communication system, in accordance with an example embodiment. The method 1200 starts with step 1201.

At step 1201, a length of a message to be transmitted to the receiver RX 103, via DAS cluster, may be determined. The length of the message may be determined by the controller 101.

At step 1203, a maximum number of RRUs of the DAS cluster for transmission of the message may be determined based on the length of the message and a minimum length of the cyclic prefix. The cyclic prefix is determined as a function of a sum of a bound on a synchronization error within the DAS cluster and a maximum tap delay of communication channels starting at the CM transmitter of the DAS cluster.

At step 1205, it may be determined whether the maximum number of RRUs required for transmitting the message is greater than the total number of RRUs in the DAS cluster. Further, for each RRU in the DAS cluster, a tap delay for a communication channel between the receiver and the CM passing through the RRU to generate a set of tap delays, may be determined. The maximum tap delay in the set of tap delays may be selected to generate the maximum tap delay of communication channels starting at the CM of the DAS cluster.

In case the maximum number of RRUs required for transmitting the message is not greater than or equal to the total number of RRUs in the DAS cluster, then at step 1207, a subset of RRUs may be selected from the plurality of RRUs of DAS cluster.

On the other hand, in case the maximum number of RRUs required for transmitting the message is greater than or equal to the total number of RRUs in the DAS cluster, then at step 1209, all the RRUs of the DAS cluster may be selected.

At step 1211, the message may be transmitted by using the selected RRUs in the DAS cluster. The message may be transmitted by each DAS cluster, of the plurality of DAS clusters, independently from other DAS clusters in the plurality of DAS clusters using a distributed cyclic delay diversity (CDD) scheme with a minimum length of a cyclic prefix.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:
1. A communication system, comprising:
a controller including one or multiple processors configured to transmit a message to a receiver;
a plurality of clusters of distributed antenna system (DAS),
wherein each DAS cluster includes a cluster master (CM) in communication with the controller and a plurality of remote radio units (RRUs) in communication with the CM,
wherein the controller and the DAS clusters are synchronized using a hierarchical precision time protocol (HPTP) in which the controller is a master clock, CMs are boundary clocks, and the RRUs are ordinary clocks synchronized to the CMs of their corresponding clusters, and
wherein each DAS cluster is configured to transmit messages independently from other DAS clusters in the plurality of DAS clusters using a distributed cyclic delay diversity (CDD) scheme with a minimum length of a cyclic prefix determined as a function of a sum of a bound on a synchronization error within the DAS cluster and a maximum tap delay of communication channels starting at the CM of the DAS cluster.

2. The communication system of claim 1, wherein for each DAS cluster, the controller is configured to:
determine, for each RRU in the DAS cluster, a tap delay for a communication channel between the receiver and the CM passing through the RRU to generate a set of tap delays; and
select the maximum tap delay in the set of tap delays to generate the maximum tap delay of communication channels starting at the CM of the DAS cluster.

3. The communication system of claim 1, wherein for the DAS cluster transmitting the message, the controller is configured to:
determine a length of the message;
determine a maximum number of RRUs of the DAS cluster for transmission of the message based on the length of the message and the minimum length of the cyclic prefix;
select a subset of RRUs from the plurality of RRUs of DAS cluster when the maximum number of RRUs is less than a total number of RRUs in the DAS cluster; or
select all the RRUs of the DAS cluster when the maximum number of RRUs is greater than or equal to the total number of RRUs in the DAS cluster; and
transmit the message using the selected RRUs.

4. The communication system of claim 1, wherein the controller is connected to a base station with a wired connection to act as a coordinated multipoint (CoMP) transmitter and receiver.

5. The communication system of claim 1,
wherein the RRUs are connected wirelessly to the CM of their corresponding DAS cluster, and
wherein the controller is connected wirelessly with the CMs.

6. The communication system of claim 1, wherein the controller is further configured to:
utilize the HPTP to configure the controller work as a master clock, the CMs as boundary clocks, and the RRUs as ordinary clocks; and
utilize a multi-level hierarchical tree structure comprising the master clock, the boundary clocks, and the ordinary clocks to enable each DAS cluster of the plurality of DAS clusters independent of each other.

7. The communication system of claim 1,
wherein the HPTP comprises one or more messages,
wherein each message of the one or more messages comprises an accurate timestamp generated and recorded at transmission and reception of the corresponding one or more messages,
wherein timestamps corresponding to the one or more messages is utilized to determine a clock offset and a propagation delay associated with the message transmitted to the receiver, and
wherein the propagation delay and the clock offset are utilized to synchronize the DAS clusters.

8. The communication system of claim 1, the receiver is configured to receive the message from the one or more DAS clusters of the plurality of DAS clusters based on a single user-multiple input and single output (SU-MISO) mode of operation.

9. A method, comprising:
in a communication system that includes:
a controller transmitting a message to a receiver;
a plurality of clusters of distributed antenna system (DAS),
wherein each DAS cluster includes a cluster master (CM) in communication with the controller and a plurality of remote radio units (RRUs) in communication with the CM,
wherein the controller and the DAS clusters are synchronized using a hierarchical precision time protocol (HPTP) in which the controller is a master clock, the CMs are boundary clocks, and the RRUs are ordinary clocks synchronized to the CMs of their corresponding clusters; and
wherein transmitting, by each DAS cluster, messages independently from other DAS clusters in the plurality of DAS clusters using a distributed cyclic delay diversity (CDD) scheme with a minimum length of a cyclic prefix determined as a function of a sum of a bound on a synchronization error within the DAS cluster and a maximum tap delay of communication channels starting at the CM of the DAS cluster.

10. The method of claim 9, wherein for each DAS cluster, the method further comprising:
determining, for each RRU in the DAS cluster, a tap delay for a communication channel between the receiver and the CM passing through the RRU to generate a set of tap delays; and
selecting the maximum tap delay in the set of tap delays to generate the maximum tap delay of communication channels starting at the CM of the DAS cluster.

11. The method of claim 9, further comprising:
determining a length of the message;
determining a maximum number of RRUs of the DAS cluster for transmission of the message based on the length of the message and the length of the cyclic prefix;
selecting a subset of RRUs from the plurality of RRUs of DAS cluster when the maximum number of RRUs is less than a total number of RRUs in the DAS cluster; or
selecting all the RRUs of the DAS cluster when the maximum number of RRUs is greater than or equal to the total number of RRUs in the DAS cluster; and
transmitting the message using the selected RRUs.

12. The method of claim 9, wherein the controller is connected to a base station with a wired connection to act as a coordinated multipoint (CoMP) transmitter and receiver.

13. The method of claim 9,
wherein the RRUs are connected wirelessly to the CM of their corresponding DAS cluster, and
wherein the controller is connected wirelessly with the CMs.

14. The method of claim 9, further comprising:
utilizing the HPTP to make the controller work as a master clock, the CMs as boundary clocks, and the RRUs as ordinary clocks; and
utilizing a multi-level hierarchical tree structure comprising the master clock, the boundary clocks, and the ordinary clocks to make each DAS cluster of the plurality of DAS clusters work independently.

15. The method of claim 9,
wherein the HPTP comprises one or more messages,
wherein each message of the one or more messages comprises an accurate timestamp generated and recorded at transmission and reception of the corresponding one or more messages, wherein timestamps corresponding to the one or more messages is utilized to determine a clock offset and a propagation delay associated with the message transmitted to the receiver, and wherein the propagation delay and the clock offset are utilized to synchronize the DAS clusters.

16. The method of claim 9, further comprising receiving the message from the one or more DAS clusters of the plurality of DAS clusters based on a single user-multiple input and single output (SU-MISO) mode of operation for the receiver.

* * * * *